United States Patent [19]
Lester

[11] Patent Number: 6,044,718
[45] Date of Patent: Apr. 4, 2000

[54] CONTINUOUSLY VARIABLE TRANSMISSION UTILIZING OSCILLATING TORQUE AND ONE WAY DRIVES

[76] Inventor: William T. Lester, 513 Kimbrough St., Fort Worth, Tex. 76108

[21] Appl. No.: 09/392,002

[22] Filed: Sep. 8, 1999

Related U.S. Application Data

[63] Continuation-in-part of application No. 09/088,972, Jun. 2, 1998.

[51] Int. Cl.⁷ ............................. F16H 29/02; F16H 33/20
[52] U.S. Cl. .............................. 74/112; 74/142; 74/143; 475/14; 475/16; 475/255
[58] Field of Search ........................... 74/112, 113, 116, 74/117, 118, 119, 125.5, 142, 143; 475/14, 16, 255

[56] References Cited

U.S. PATENT DOCUMENTS

| | | |
|---|---|---|
| 875,748 | 1/1908 | Thayer . |
| 2,108,991 | 2/1938 | Mueller .................................... 74/143 |
| 2,212,872 | 8/1940 | Barker ........................................ 74/70 |
| 2,227,867 | 1/1941 | Steinhaus .................................... 74/61 |
| 2,293,962 | 8/1942 | Baily ......................................... 94/48 |
| 3,447,398 | 6/1969 | Chen ....................................... 475/255 |
| 3,805,514 | 4/1974 | Bodine ................................... 74/89 X |
| 3,983,759 | 10/1976 | Linden ....................................... 74/88 |
| 4,285,405 | 8/1981 | Weir, Jr. ................................. 173/162 |
| 4,503,724 | 3/1985 | Ward ........................................ 74/143 |
| 4,907,474 | 3/1990 | Bolger ....................................... 475/14 |
| 5,009,132 | 4/1991 | Gilberto ................................... 81/57.3 |
| 5,071,394 | 12/1991 | Lester ..................................... 475/185 |
| 5,136,888 | 8/1992 | Nix ........................................... 74/88 |
| 5,253,542 | 10/1993 | Houze ....................................... 74/61 |
| 5,388,469 | 2/1995 | Woltering .................................. 74/61 |
| 5,860,321 | 1/1999 | Williams et al. ........................ 74/143 |

OTHER PUBLICATIONS

*One Way Clutch Design Guide Types, Selection, Applications*, Borg–Warner Automotive Automatic Transmission Systems Corporation, 1978, pp. 1–33.

*Primary Examiner*—Allan D. Herrmann
*Attorney, Agent, or Firm*—Geoffrey A. Mantooth

[57] ABSTRACT

A transmission utilizes oscillating torque to vary the mechanical power transmitted to a load. An arm assembly is rotatably coupled to a frame. At the ends of the arms are eccentric masses, rotatably coupled thereto. An input shaft rotates the masses about the ends of the arms. The rotating masses produce an oscillating torque that causes the arms to oscillate. The arms are coupled to an output assembly. The output assembly utilizes one way clutches, with one clutch reversed relative to the other clutch. The one way clutches convert the bidirectional rotation of the arms to unidirectional rotation for the load. The output speeds of the transmission are controlled by providing at least two side by side rotatable masses and varying the phase of one of the masses relative to the other mass. Varying the phase changes the center of gravity of the masses, thereby affecting the torque applied to the arms.

8 Claims, 20 Drawing Sheets

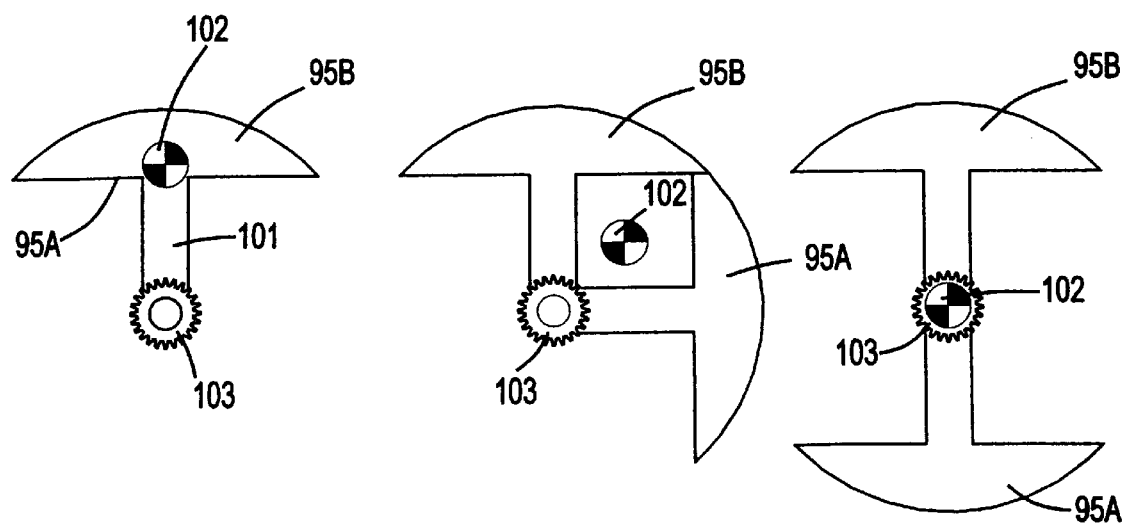

CONTINUOUSLY VARIABLE TRANSMISSION UTILIZING OSCILLATING TORQUE AND ONE WAY DRIVES

This application is a continuation-in-part of U.S. application Ser. No. 09/088,972, filed Jun. 2, 1998.

FIELD OF THE INVENTION

The present invention relates to transmissions of the type that are used to regulate the transmission of power from an engine or prime mover to a load, such as are used in automobiles.

BACKGROUND OF THE INVENTION

Transmissions are used in a variety of applications to change the speed and torque provided by an engine or prime mover. One popular application of transmissions is in an automobile. In an automobile, the transmission is connected between the engine and the drive wheels or tires.

Prior art automobiles utilize fixed ratio transmissions. These transmissions have a set of gears that provide a few fixed and discrete speed ratios between the input from the engine and the output to the tires. Engine rpm (revolutions per minute) varies over a wide range for each speed ratio. Because the engine must operate over a wide range of speeds, its overall efficiency is reduced.

Continuously variable transmissions offer a way to boost engine efficiency. Unlike fixed ratio transmissions, continuously variable transmissions offer a wide range of speed ratios between the input from the engine and the output to the tires. This allows the engine to operate over a narrow range of optimum rpm's, wherein the engine efficiency can be increased. By varying the speed ratio, the engine speed can be maintained in its optimum range, even for a variety of driving conditions, thereby improving fuel efficiency.

SUMMARY OF THE INVENTION

It is an object of the present invention to provide a continuously variable transmission.

The present invention provides a transmission that comprises a rotatable input member. There is also an arm that has a length and an end. The arm has an axis that is transverse to the length, with the end being spaced from the axis. The arm end is rotatable about the axis. The arm is rotatable independently of the input member. The arm has a mass that is rotatably coupled to the arm end. The mass is eccentric with respect to the arm end. The input member is coupled to the mass so as to cause the mass to rotate with respect to the arm end. First and second one way clutches are coupled between the arm and an output member. The first one way clutch drives the output member in one direction when the arm is rotated in that direction. The second one way clutch prevents the arm from rotating in the other direction.

In accordance with one aspect of the invention, the transmission also comprises a frame that is stationary with respect to the input member, the arm and the output member, wherein the second one way clutch is coupled to the frame.

In another aspect of the invention, the coupling of the mass to the input member comprises gears and the gears comprise a timing gear located on the arm.

In another aspect of the invention, the mass is a first mass. The transmission also comprises a second mass rotatably coupled to the arm end, the second mass is eccentric with respect to the arm end and is rotatable by the input member. The second mass has an adjustable phase with respect to the first mass. There is a phase controller coupled to the second mass so as to adjust the phase of the second mass with respect to the first mass.

In accordance with another aspect of the present invention, the arm has a first counterbalance for the first mass and a second counterbalance for the second mass.

In accordance with another aspect of the present invention, the arm end is a first arm end. The arm has a second end and is rotatable about an intermediate portion between the first and second arms. A third mass and a fourth mass are rotatably coupled to the arm second end. The third and fourth masses are eccentric with respect to the arm second end and are rotatable by the input member. The fourth mass has an adjustable phase with respect to the third mass. The phase controller is coupled to the fourth mass so as to adjust the phase of the fourth mass relative to the third mass.

In accordance with another aspect of the invention, there is a method of transmitting mechanical power from a source to a load. A rotational input is received from the source. The rotational input is used to rotate an eccentric mass about the end of an arm, thereby producing a torque on the arm. The arm is allowed to rotate in a first direction but is prevented from rotating in the opposite direction. The torque acting on the arm in the first direction is then provided to the load.

In accordance with another aspect of the method and invention the mass is a first mass. A second eccentric mass is rotated about the end of the arm. The phase between the first and second masses is adjusted so as to control the amount of torque applied to the arm.

In accordance with another aspect of the invention, there is a transmission that includes a rotatable input member. There is also an arm that has a length and an end. The arm has an axis that is transverse to the length, with the end being spaced from the axis. The arm is rotatable independently of the input member. The arm has an extension that is rotatably coupled to the arm end. A mass is rotatably mounted to the extension, with the mass being eccentric with respect to the arm end. The input member is coupled to the mass so as to cause the mass to rotate with respect to the arm end. A belt couples the mass to the end of the arm. The belt bears much of the centrifugal force produced by the mass. First and second one way clutches are coupled between the arm and an output member.

BRIEF DESCRIPTION OF THE DRAWINGS

FIG. 16 is a cross-sectional view of the arm assembly taken through lines XVI—XVI of FIG. 2. FIGS. 16–19 are views illustrating rotation of the arm as caused by rotation of the eccentric and rotatable masses.

FIGS. 20–22 are diagrams illustrating the effect of phase changes of the rotatable masses on the center of gravity of the rotatable masses.

DESCRIPTION OF THE PREFERRED EMBODIMENT

Figure 1:
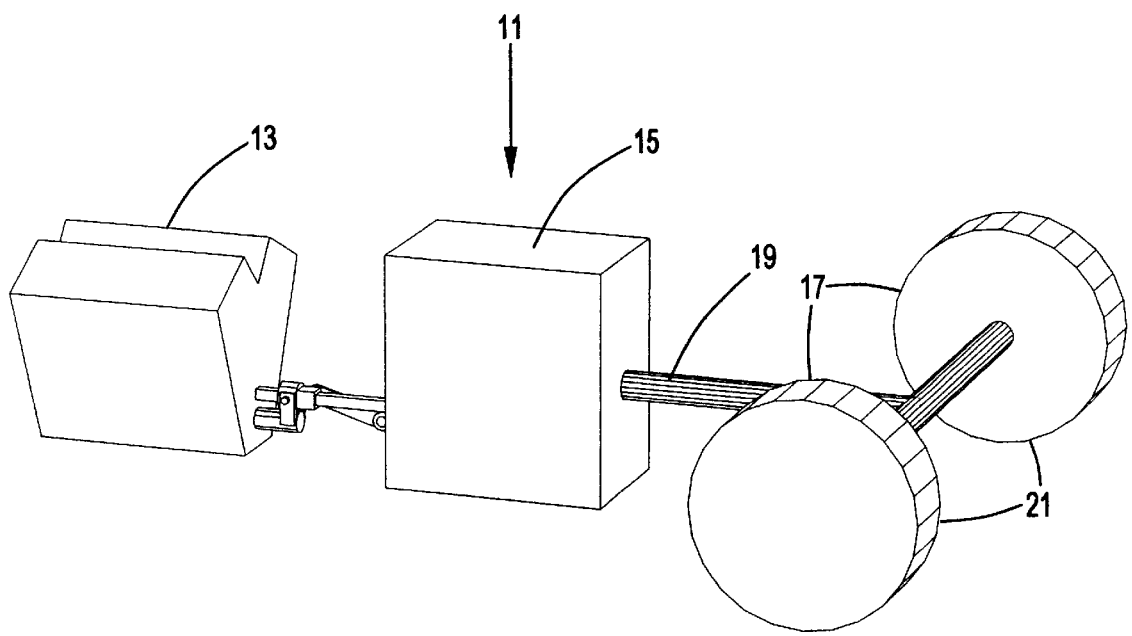
FIG. 1 is a schematic view of a vehicle drive train, showing the transmission of the present invention.

In FIG. 1, there is shown a schematic diagram of a vehicle power system 11. The system has a prime mover 13, a transmission 15, and an output load 17.

The prime mover 13 is typically an internal combustion engine and can be powered by gasoline, diesel, natural gas, etc. Alternatively, the prime mover can be electric motors or some other source of power.

The transmission 15 is that of the present invention, shown in accordance with a preferred embodiment. The transmission 15 has an input that is connected to the prime mover 13 and an output that is connected to the load 17. The load 17 is shown as being a drive shaft 19 and vehicle wheels 21.

The transmission 15 is of a continuously variable type. Many internal combustion engines (and electric motors) operate more efficiently within a narrow range of engine speeds. A continuously variable transmission can be provided with a narrow range of input speeds and produce a wide range of output speeds for the load. Unlike prior art gear transmissions, where each output speed has a specific gear, a continuously variable transmission provides a continuous output of speeds. This allows the engine to operate within a narrow, and thus more efficient, range of speeds.

Figure 2:
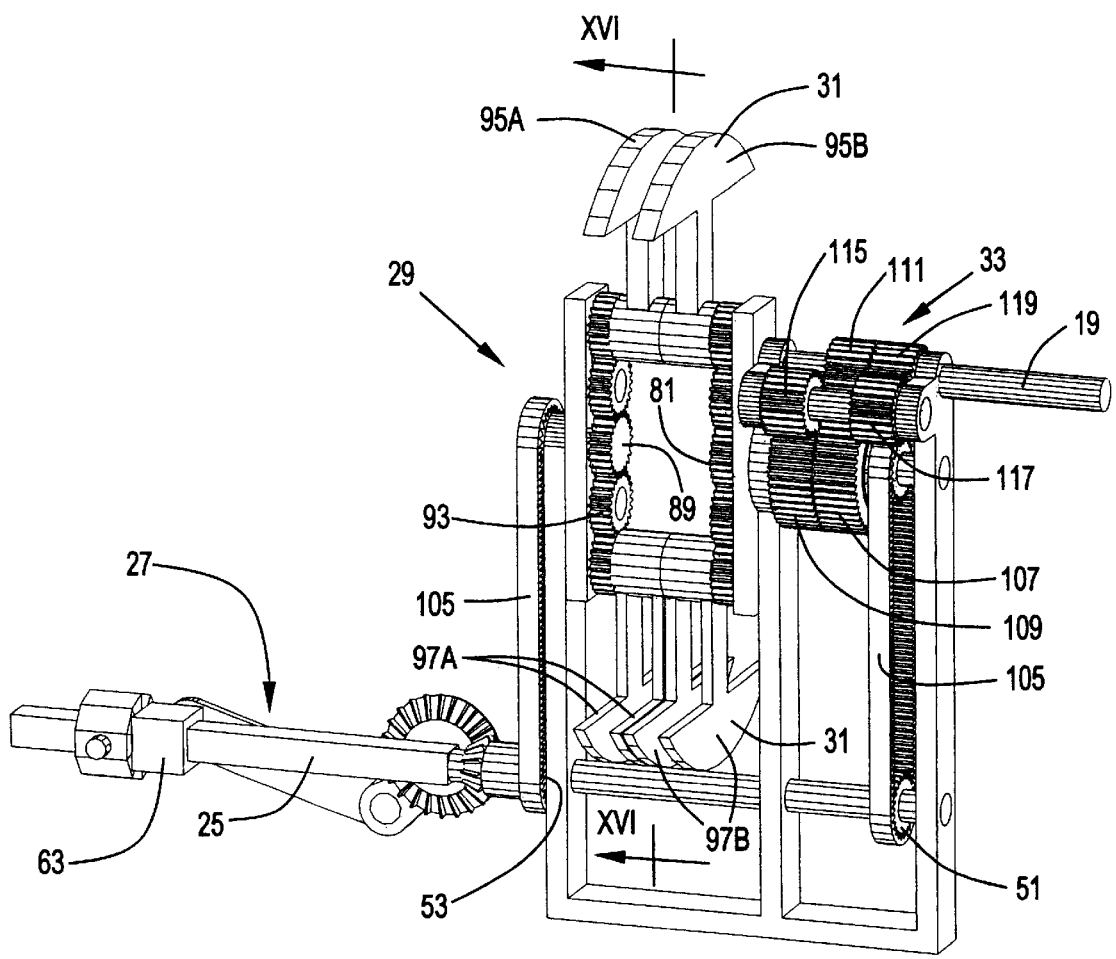
FIG. 2 is an isometric view of the transmission of the present invention, in accordance with a preferred embodiment.

Referring to FIGS. 1 and 2, the transmission 15 has a frame 23, an input shaft 25, a speed control 27, an arm assembly 29, rotatable masses 31, and an output assembly 33. The prime mover or engine 13 rotates the input shaft 25. The transmission takes the rotational power of the input shaft 25 and converts that power into oscillating torque. This is accomplished by rotating the eccentrically mounted masses 31 about the ends of the arm assembly 29. As the masses 31 rotate, they exert a torque, first in one direction (for example clockwise), and then in the other direction (for example counterclockwise). The oscillating torque acts on the arm assembly and causes the arm assembly to rotate back and forth. Thus, the arm assembly rotates in both directions. This bidirectional rotation is converted into rotation in a single direction by the output assembly 33. The output assembly 33 provides rotational power to the load 17.

Thus, the transmission 15 takes the rotational power of the input shaft 25 and transmits that power to the load.

The output speed of the transmission is controlled by controlling the amount of oscillating torque applied to the arm assembly 29. When the transmission is connected to the load, greater torque produces a greater output speed, and vice versa. The amount of torque that is applied to the arm assembly 29 is controlled by the speed control 27. The output speed is high if the oscillating torque that is applied to the arm assembly is high. To reduce the output speed, the oscillating torque is reduced.

The oscillating torque is controlled by manipulating the masses 31. The formula for torque is:

Torque=Fd where F=force (predominantly centrifugal force as is explained below) produced by the masses, and d=distance from the force to the axis of rotation.

Thus, the torque can be varied by changing the force that is applied by the masses or the distance with which the force is applied. In the preferred embodiment, plural eccentric masses are provided on the end of the arm assembly 29. The masses taken together have a center of gravity, which center of gravity rotates to produce the torque on the arm assembly. The center of gravity can be changed by changing the orientation of the masses relative to each other. If the masses are aligned with each other, then the center of gravity is at its furthermost distance from the axis of rotation of the arm assembly and produces the maximum torque. In this alignment, the masses are said to be in phase with each other. If the masses are aligned opposite of each other, then center of gravity is at the axis of rotation of the masses, wherein no torque is produced on the arm assembly. The oppositely aligned masses are said to be 180 degrees out of phase.

The masses can be aligned relative to each other at any phase between zero and 180 degrees. Thus, the torque that is applied to the arm assembly can be changed over a continuous range. This in turn produces a continuously variable output speed to the load.

Figure 3:
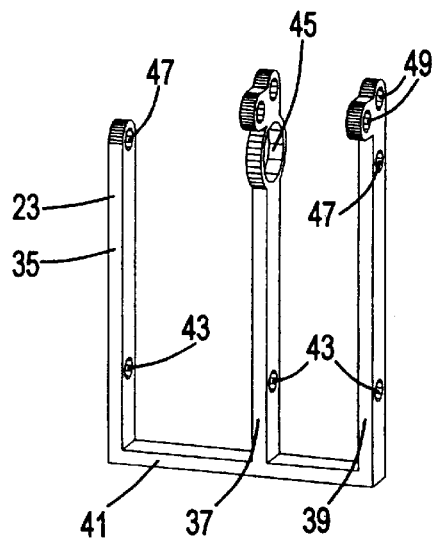
FIG. 3 is an isometric view of the frame.

The transmission 15 will now be described in more detail. Referring to FIG. 3, a preferred embodiment of the frame 23 is shown. The frame 23 is stationary and supports the rotating members. The frame 23 has first, second and third legs 35, 37, 39 that are all coupled together at one end by a base member 41. The legs are parallel to each other and are spaced apart from each other. The legs are provided with various openings 43, 45, 47, 49 to receive some of the other components, as will be described in more detail below. The frame 23 can be mounted to a fixed object such as a vehicle or equipment chassis or a building floor.

In the description that follows, "inside" refers to the space between the first and third legs 35, 39, while "outside" refers to the space on the side of the first leg that is opposite the inside and to the space on the side of the third leg that is opposite the inside.

Figures 4A, 4B:
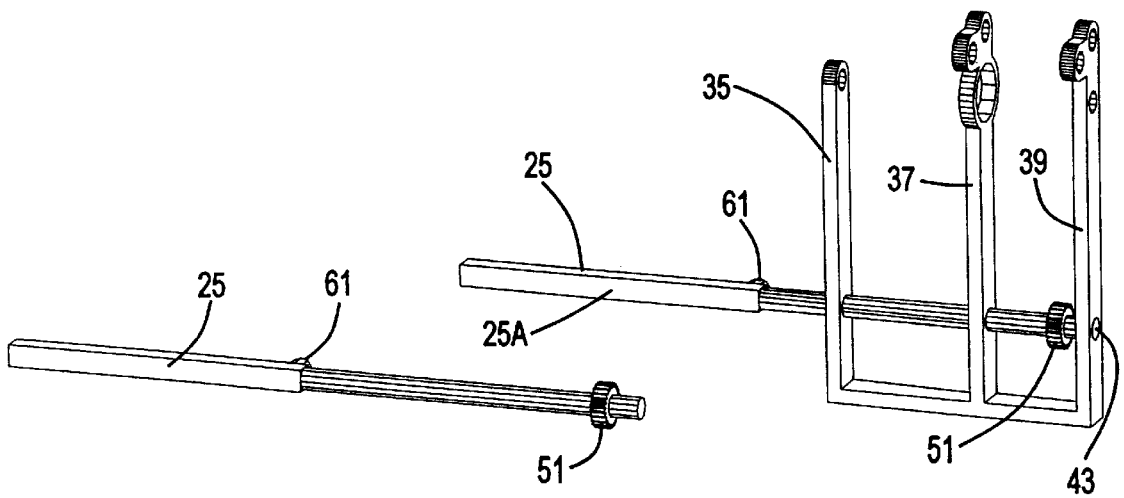
FIGS. 4A and 4B are respective isometric views of the input shaft and the input shaft assembled into the transmission.

The input shaft 25 is shown in FIGS. 4A and 4B. The input shaft 25 is rotatably coupled to all three legs of the frames by the openings 43. The rotatable coupling can be by the use of bearings or bushings. The shaft is secured so as to prevent movement along its longitudinal axis relative to the frame. The portion of the input shaft 25 that is located between the second and third legs 37, 39 has a gear 51 mounted thereon. The gear 51 rotates in unison with the input shaft 25. The input shaft extends out from the first leg 35 for some distance. This outer portion 25A of the input shaft is structured and arranged to be coupled to the output of the prime mover. The input shaft need not be coupled directly to a prime mover, and instead can be coupled to some rotary power source.

Figures 5A, 5B:
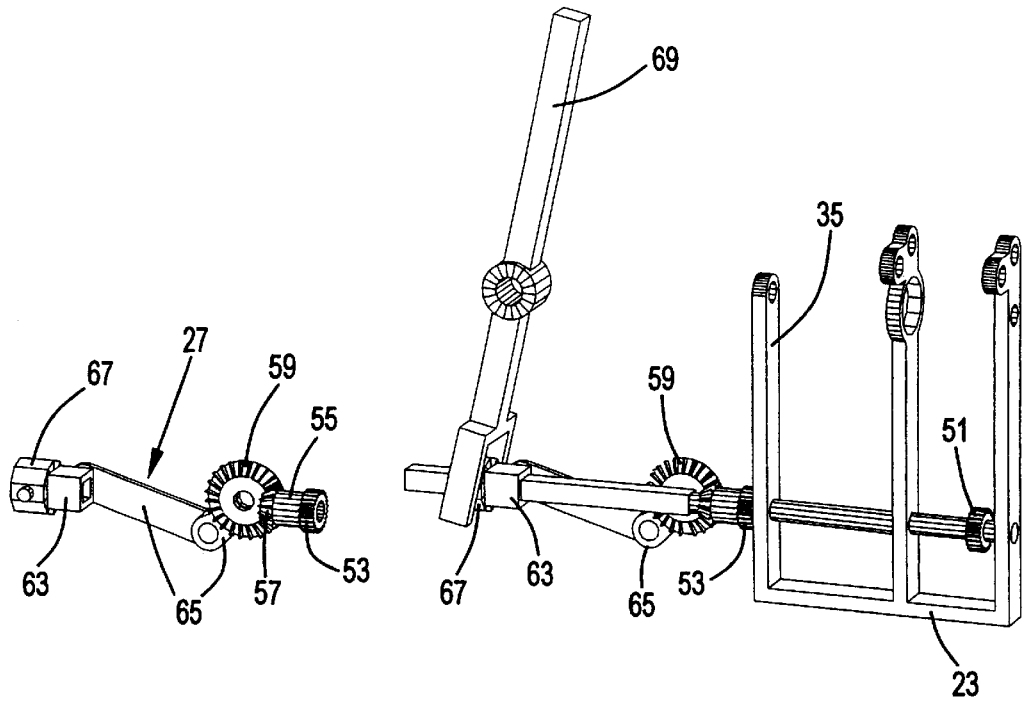
FIGS. 5A and 5B are respective isometric views of the speed control and the speed control as assembled into the transmission.

The speed control 27 is shown individually in FIG. 5A and is mounted to the input shaft in FIG. 5B. The speed control is used to adjust the orientation of the rotatable masses relative to each other. The speed control has a gear 53 that is located around the input shaft 25 and that can rotate independently of the input shaft. However, the gear is coupled to the input shaft 25 by the remainder of the speed control so as to rotate in general with the input shaft. The gear 53 is mounted to one end of an extension tube 55. On the other end of the extension tube 55 is a first bevel gear 57. The gear 53, the extension tube 55 and the first bevel gear 57 can be integral with each other and are located on the input shaft 25, outside of the first leg 35.

The speed control 27 also has a second bevel gear 59 that is mounted onto a perpendicularly extending projection 61 (see FIG. 4A) of the input shaft 25. The second bevel gear 59 can rotate about this projection 61. The second bevel gear 59 is connected to a slide block 63 by way of a two piece linkage 65. The slide block 63 can slide along the longitudinal axis of the input shaft 25, but rotates therewith. In the preferred embodiment, that portion 25A of the input shaft has a square cross section, as does the hole through the slide block 63, in order to cause the slide block to rotate with the input shaft. Other forms of coupling can be used to slidingly couple the slide block to the input shaft (for example, a key). The slide block 63 is rotatably coupled to a control member 67, also mounted onto the input shaft 25. The control member 67 slides along the input shaft with the slide block 63. However, as the input shaft 25 and the slide block 63 rotate, the control member 67 remains stationary. The control member 67 is connected to a stick 69. The stick 69 is moved by an operator to vary the output speed of the transmission.

As the stick 69 is moved, the control member 67 and the slide block 63 move along the length of the input shaft 25.

As the control member 67 slides along the input shaft, the first and second bevel gears 57, 59 and the gear 53 rotate relative to the input shaft 25 and relative to the other gear 51. As the input shaft 25 rotates, the slide block 63 rotates, as does the linkage 65 and the second bevel gear 59 (by way of the projection 61). The second bevel gear 59 rotates the gear 53. The control block 67 does not rotate.

Figures 6A, 6B:
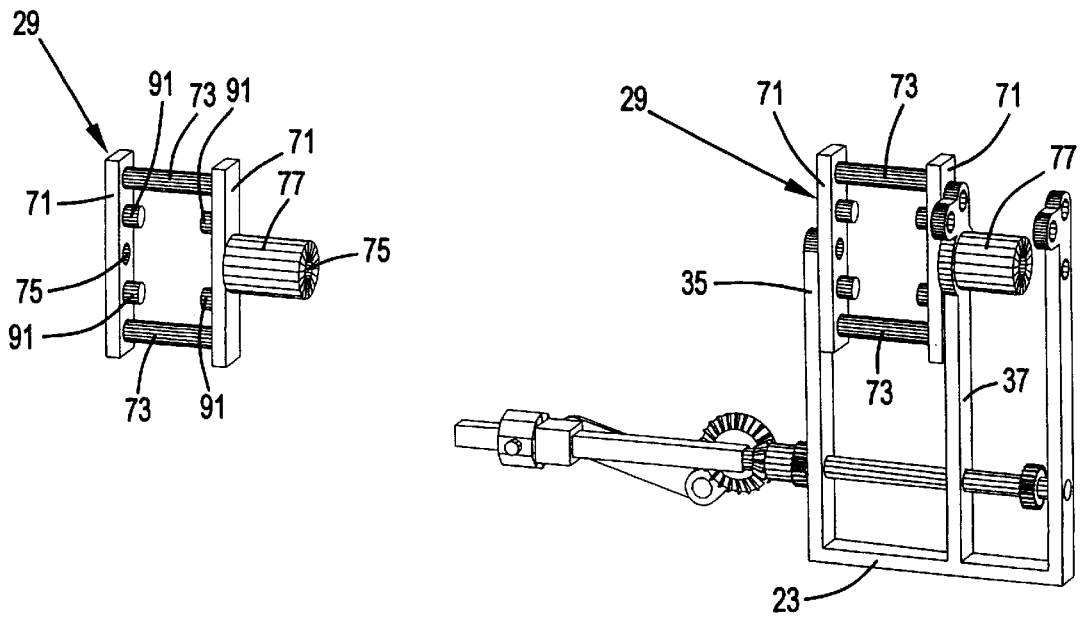
FIGS. 6A and 6B are isometric views of the arm assembly and the arm assembly as assembled into the transmission.

The arm assembly 29 is shown in FIG. 6A. The arm assembly 29 has two parallel and spaced apart arms 71. The ends of the arms 71 are coupled together by shafts 73 to form a rectangular shape as shown. The center of each arm 71 has an opening 75 for use in mounting to the frame 23. One of the arms has a mounting tube 77 mounted thereon and extending perpendicularly therefrom. The mounting tube 77 has an opening 75 extending therethrough.

Figures 7A, 7B:
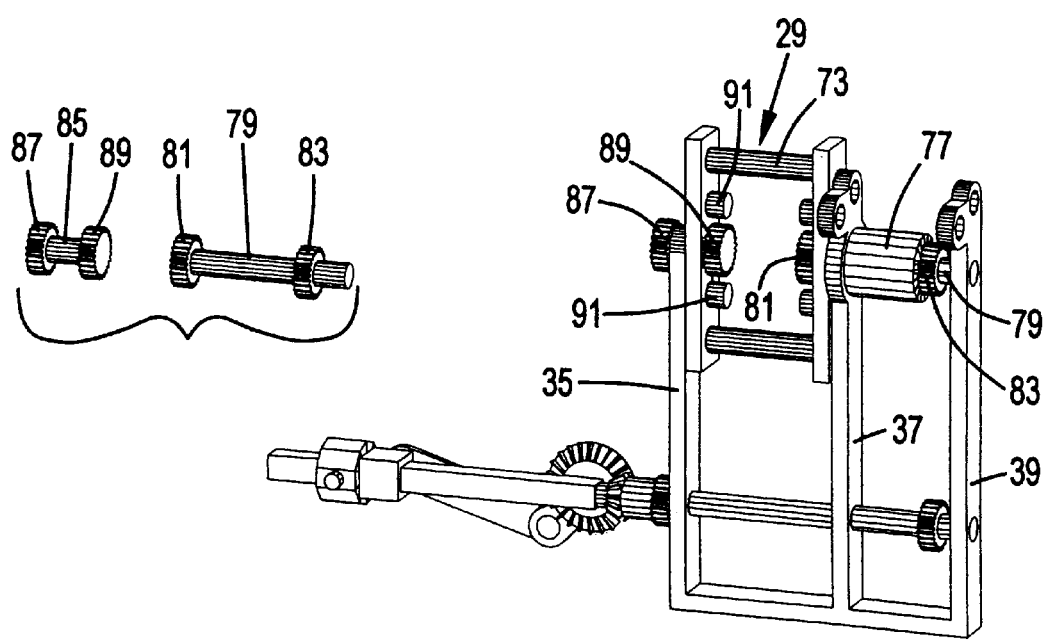
FIGS. 7A and 7B are isometric views of the arm shafts, and the arm shafts as assembled into the transmission.

The arm assembly 29 is located between the first and second legs 35, 37 of the frame 23 as shown in FIG. 6B. The mounting tube 77 is located through the opening 45 (see FIG. 3) in the second leg 37. The mounting tube is rotatable with respect to the second leg 37. The mounting tube 77 receives a first input arm shaft 79 (see FIGS. 7A and 7B), which shaft extends through the arm with the mounting tube (which arm is adjacent to the second leg 37), through the mounting tube, and into an opening 47 (see FIG. 3) in the third leg 39 of the frame 23. The first input arm shaft 79 has two gears 81, 83 thereon, which gears rotate in unison with the shaft 79. One gear 81 is located on the inside of the arm assembly 29. The other gear 83 is located between the mounting tube 77 and the third leg 39. The other arm (adjacent to the first leg 35) is coupled to the first leg by a second input arm shaft 85, which shaft extends through respective openings 47, 75 in each of the first leg and the arm. The second input arm shaft 85 has a gear 87, 89 located on each end of the shaft. The gears rotate in unison with the second input arm shaft 85. Thus, there is a gear 87 on the outside of the first leg 35, and another gear 89 located inside of the arm assembly 29. The second input arm shaft 85 rotates independently of the arm assembly 29 and the frame 23. The second input arm shaft 85 also assists in mounting the arm assembly 29 to the frame 23. The arm assembly 29 rotates relative to the frame about the shafts 79, 85.

Figures 8A, 8B:
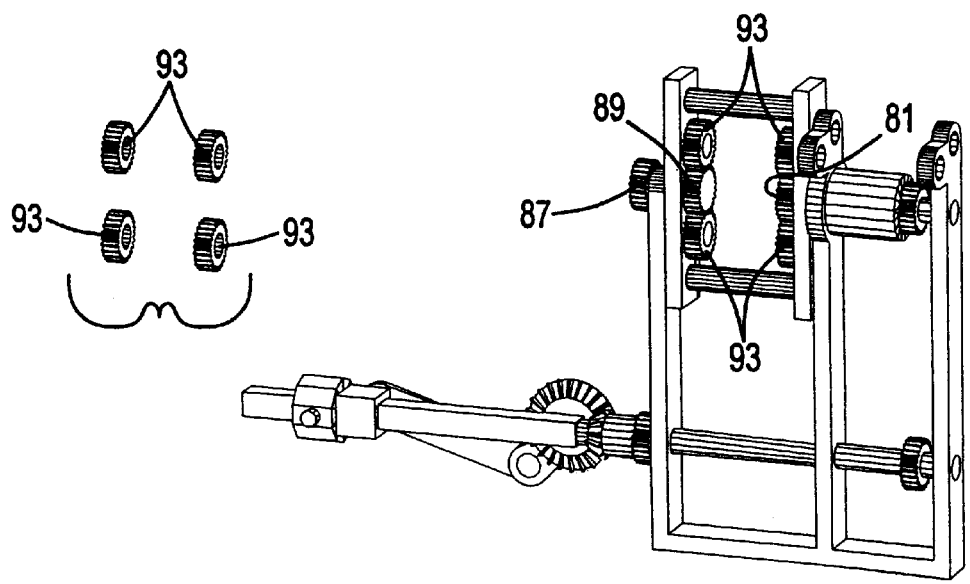
FIGS. 8A and 8B are respective isometric views of timing gears, and the timing gears as assembled into the transmission.

The insides of the arm assembly 29 have perpendicularly extending projections 91 (see FIGS. 6A and 7B) that are adjacent to the inside gears 81, 89. There is a projection 91 interposed between the inside gears and each shaft 73. A timing gear 93 fits onto each of these projections 91, as shown in FIGS. 8A and 8B. The timing gears 93 on each arm are rotatably coupled together by way of the inside gears 81, 89.

Figure 9A:
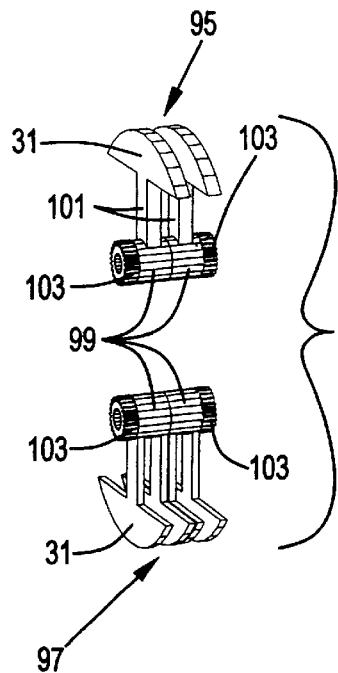
FIGS. 9A and 9B are respective isometric views of the rotatable masses, and the rotatable masses as assembled into the transmission.
Figure 9B:
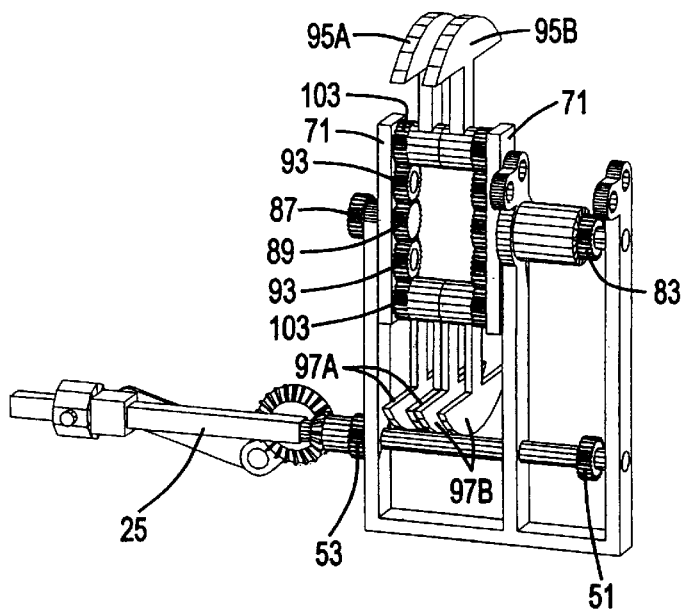

The rotatable masses 31 are shown in FIGS. 9A and 9B. The masses 31 are eccentric with respect to the shafts 73 (and thus the ends of the arms 71), so that when the masses are rotated, centrifugal forces are applied to the arms. The rotatable masses are grouped together in first and second sets 95, 97. Each set has one or more phasing masses (95A, 97A) and one or more nonphasing masses (95B, 97B). Each set also has a pair of hubs 99 that are rotatably mounted onto the shafts 73 of the arm assembly 29 (see FIG. 6B). Extensions 101 project radially outward from each hub 99. At the end of each extension 101 is a mass or weight 31.

The outer end of each hub 99 has a gear 103. Thus, when the hubs 99 are assembled onto the respective arm assembly shaft 73, the gears 103 mesh with the timing gears 93.

Figure 25:
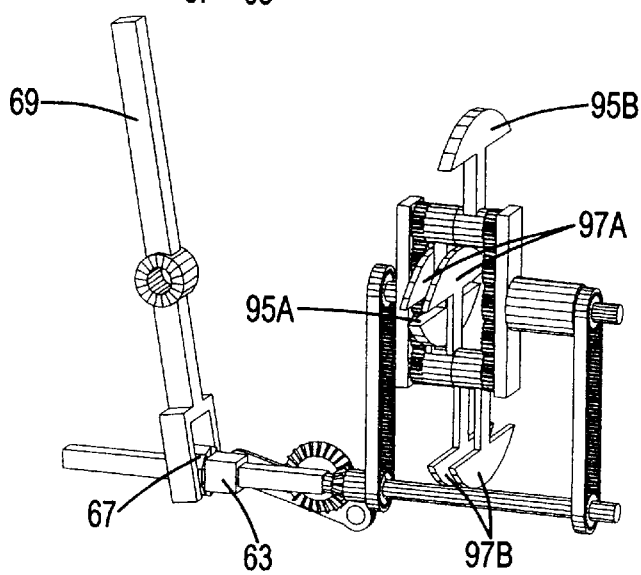
FIG. 25 is similar to FIG. 23, except the rotatable masses are shown 180 degrees out of phase with each other.

When rotated, the masses 31 are able to rotate 360 degrees around their respective shafts 73. Thus, the shape of the masses 31 and the length of the extensions 101 must be such as to allow the rotation. Furthermore, the first set 95 of masses must avoid contacting the second set 97 of masses. In order to avoid the masses of one set 95 from contacting the masses of the other set 97, the masses of the first set are offset between the arms 71 relative to the masses of the second set. For example, the masses 95A, 95B (and their extensions) of the first set 95 are centered along the length of the respective hubs 99, while the masses 97A, 97B of the second set 97 are located toward the ends of the respective hubs. Thus, as shown in FIG. 25, each mass of the first set (for example mass 95A) passes between the two masses of the second set (for example masses 97B) without interference or contact. The weight of the two masses of the second set and their extensions is equal to the weight of one of the first set of masses and its extension. By distributing the masses in this manner, the center of gravity is maintained in a location that minimizes vibration of the transmission.

The timing gears 93 reduce feedback loads which might be caused by the masses.

Figure 10A:
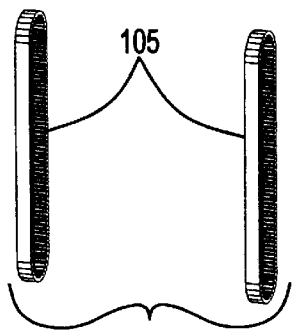
FIGS. 10A and 10B are respective isometric views of the drive belts, and the drive belts as assembled into the transmission.
Figure 10B:
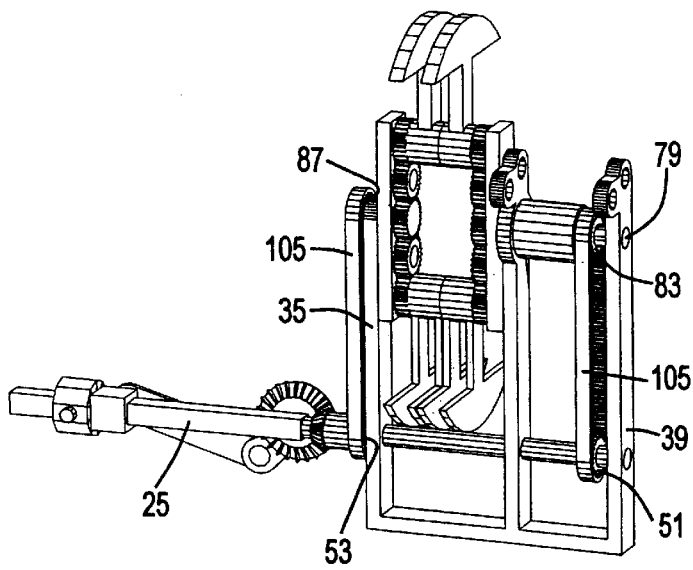
Figures 11A, 11B:
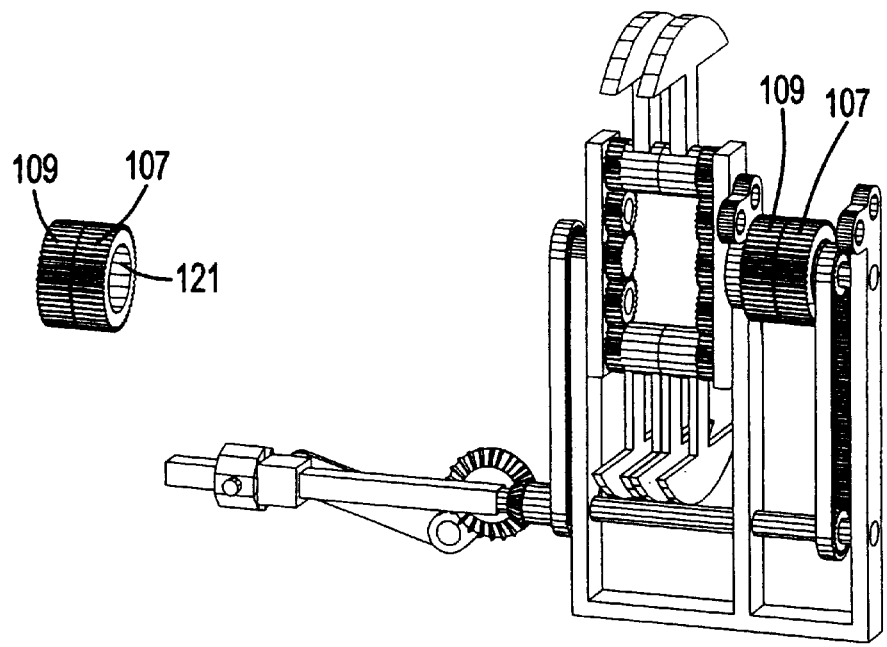
FIGS. 11A and 11B are respective isometric views of the one way gears, and the one way gears as assembled into the transmission.

The masses are rotated by way of drive belts 105 (see FIGS. 10A and 10B). There is one drive belt 105 located outside of the first leg 35 and couples the gear 53 on the input shaft 25 to the gear 87 on the second input arm shaft 85. Another belt 105 is located on the inside of the third leg 39 and couples the gear 51 on the input shaft 25 to the gear 83 on the first input arm shaft 79. Thus, the first and second input arm shafts 79, 85 (see FIG. 7A) are coupled to the input shaft 25.

The output assembly 33 is shown in FIGS. 11A, 11B, 12A, 12B. The output assembly 33 has first and second one way gears 107, 109 that are mounted onto the mounting tube 77 (see FIGS. 6A, 11A and 11B). When the mounting tube 77 rotates in a first direction, the first one way gear 107 is driven in the first direction, while the second one way gears is not driven. When the mounting tube rotates in the opposite, or second, direction, the second one way gear 109 is driven in the second direction, while the first one way gear is not driven. When a one way gear is not driven, it can slip against the mounting tube.

Figures 12A, 12B:
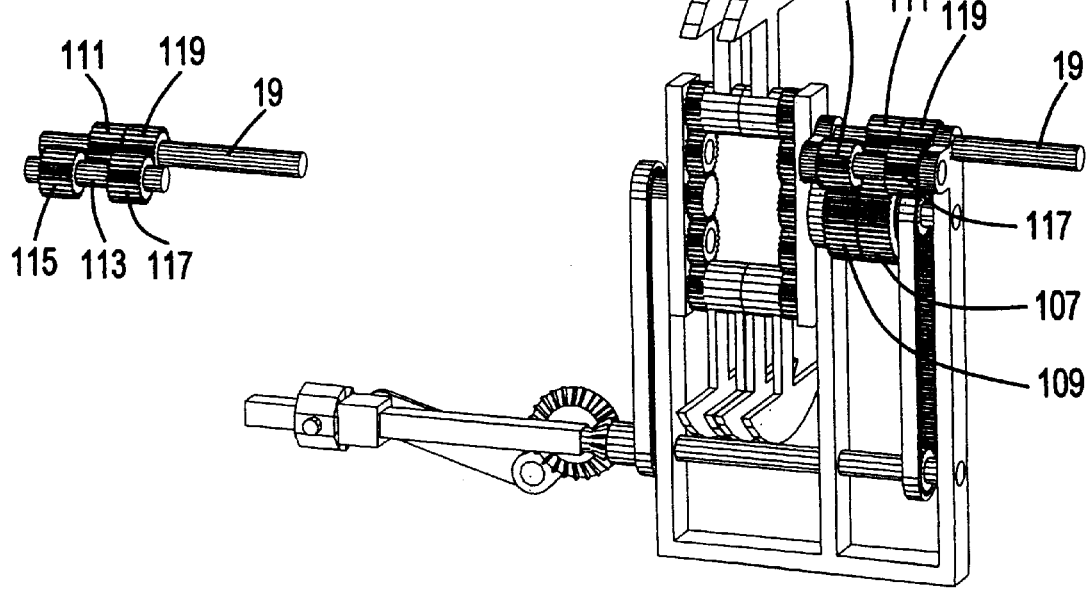
FIGS. 12A and 12B are respective isometric views of the output assembly, and the output assembly as assembled into the transmission.

The movement of the one way gears is provided to the output, or drive, shaft 19 (see FIGS. 12A and 12B). The first one way gear 107 is coupled to the output shaft 19 by a gear 111 on the output shaft. The second one way gear 109 is coupled to the output shaft by way of an auxiliary shaft 113. The auxiliary shaft has a gear 115 that meshes with the second one way gear 109. The auxiliary shaft 113 also has a gear 117 that meshes with a gear 119 on the output shaft 19. The gears 111, 119 rotate in unison with the output shaft 19, while the gears 115, 117 rotate in unison with the auxiliary shaft 113.

Figure 13:
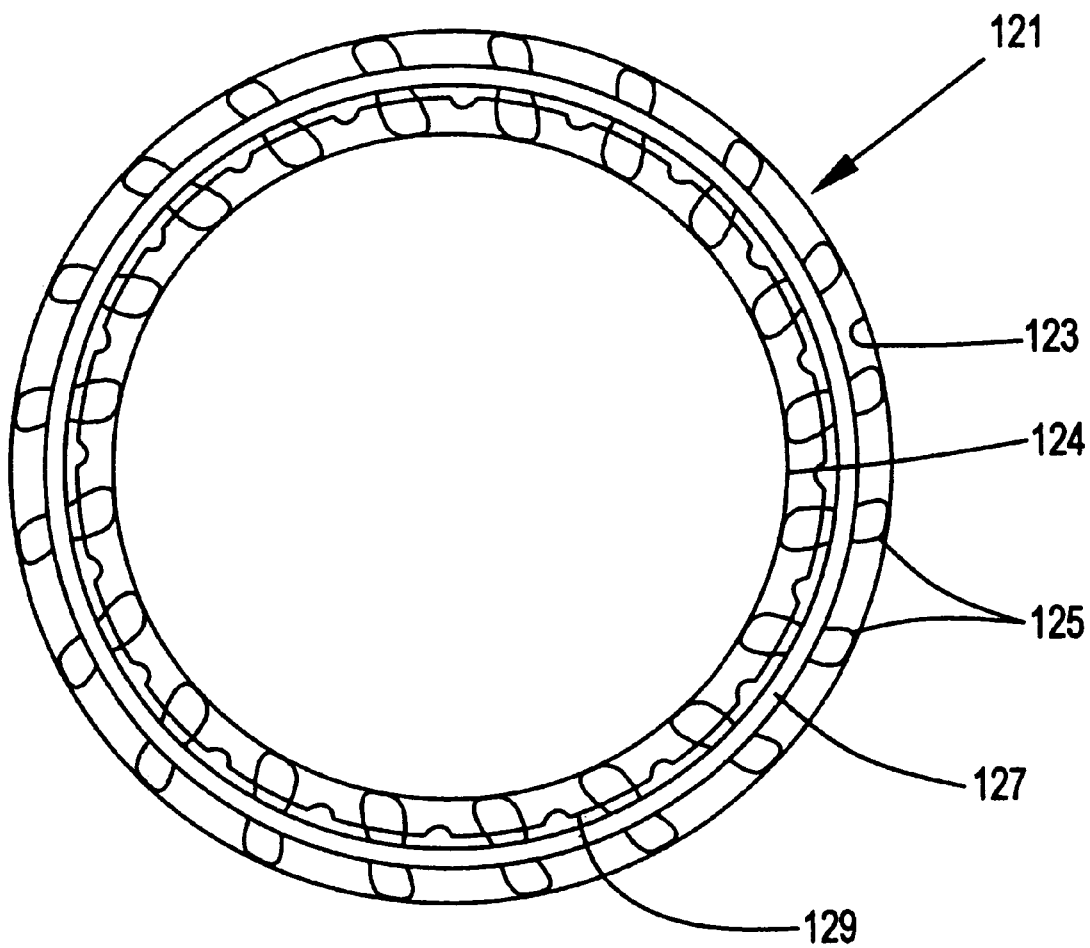
FIG. 13 is a plan view of a sprag clutch.

The one way gears 107, 109 utilize conventional one way clutches 121 (see FIG. 13). There are four basic types of one way clutches, namely ratchet, spring, roller or ball, and sprag clutches. (See *One Way Clutch Design Guide Types, Selection, Applications*, Borg Warner Automotive, 1978, the disclosure of which is incorporated by reference herein.) Sprag clutches are used in the preferred embodiment. Sprag clutches are conventional and commercially available devices. Each gear 107, 109 has a sprag clutch 121 located inside of the gear. Referring to FIG. 13, each sprag clutch has plain cylindrical races 123, 124. There is an outer race 123 and an inner race 124. Between the races 123 are stacked a series of cams or sprags 125 arranged so that in one direction of rotation, the sprags wedge between the races and transmit torque through the clutch, and in the other direction of rotation, the sprags deflect against an energizing spring 129 to permit one race to rotate without driving the other race. The sprags 125 are retained by one or two cages 127 (in FIG. 13, the clutch that is shown is a single-cage sprag clutch). The cages 127 assures equal spacing in axial alignment of the sprags 125. The spring 129 keeps the sprags in contact with the races and maintains proper sprag positioning relative to the surface of the races.

The inner race 124 of each clutch 121 is coupled to the mounting tube 77. The outer race 123 of each clutch is coupled to the respective gear 107, 109. The sprags 125 of the first one way gear 107 are oriented in the opposite direction from the sprags of the second one way gear 109. Thus, one clutch is reversed relative to the other clutch.

The output shaft 19 and the auxiliary shaft 113 are rotatably coupled to the frame by way of openings 49 (see FIG. 3) and bearings or bushings.

The output shaft 19 is coupled to the load, which is illustrated as wheels 21 (see FIG. 1).

The operation of the transmission will now be described. The operational workings will first be described, followed by a discussion of how the output speed is controlled.

In general, rotation of the input shaft 25 (see FIG. 2) will produce a rotation of the output shaft 19. The input shaft 25 rotates the masses 31 about the ends of the arm assembly 29. The first set masses 95A, 95B rotate in the same direction as the second set masses 97A, 97B. As the masses rotate, a variable torque is applied to the arm assembly 29. The arm assembly is rotated first in one direction and then in the opposite direction. This rotation typically is less than a complete revolution.

The arm assembly 29 is integral with the mounting tube 77. Thus, the mounting tube rotates back and forth in the two directions. This back and forth rotation is translated by the one way gears 107, 109 into the output shaft 19 rotating in a single direction.

The specifics will now be described. The prime mover 13 is operated at a constant speed or within a narrow range of speeds. Thus, the prime mover can be designed to operate more efficiently. The input shaft 25 is rotated by the prime mover (see FIG. 1). Referring to FIG. 2, as the input shaft 25 rotates, the two gears 51, 53 rotate. This in turn causes the drive belts 105 to rotate. The drive belts 105 rotate the first and second input arm shafts 79, 85, (see FIG. 7B) which in turn rotate the inner gears 81, 89 inside of the arm assembly 29.

The arms 71 are free to rotate about the first and second input arm shafts 79, 85 and the frame 23. Thus, if there were no eccentric masses at the ends of the arms, the arms would remain stationary (assuming no friction) even if the input shaft 25 was rotating. However, the provision of the rotating eccentric masses creates torque at the ends of the arms that causes the arms to rotate.

Figures 14, 15:
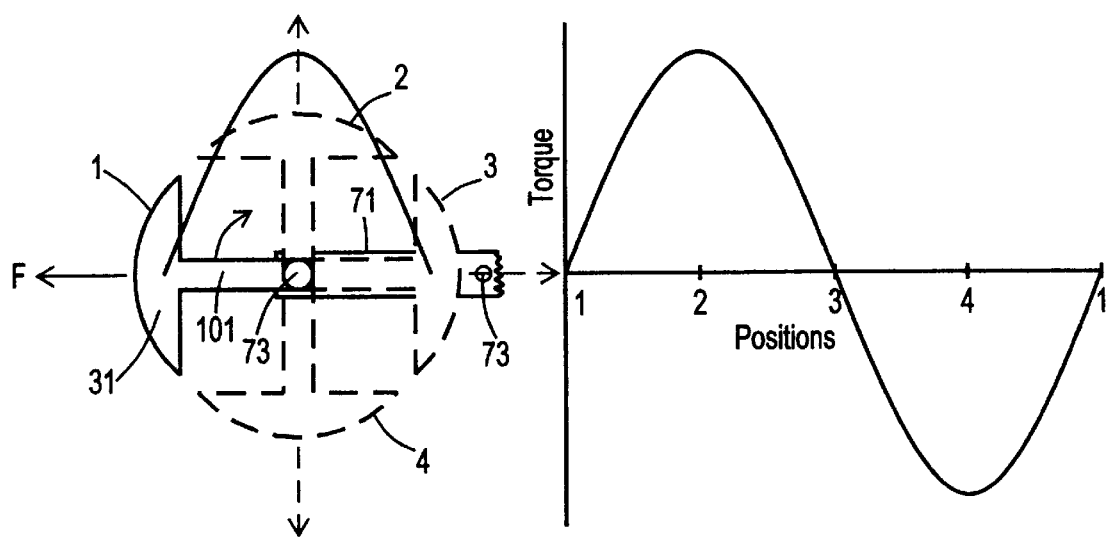
FIG. 14 is a diagram illustrating the various rotational positions of a rotatable mass with respect to the end of an arm.
FIG. 15 is a diagram illustrating the torque relative to the various positions of the rotatable mass of FIG. 14.

The eccentrically mounted masses 31 exert pulling forces on the arms when the masses are rotated. Referring to FIG. 14, one end of an arm is shown, with a clockwise rotating mass 31 thereon. The rotating mass 31 produces a centrifugal force that causes the arm 71 to rotate about the first and second input arm shafts 79, 85.

The general formula for the acceleration that is produced by the mass 31 is:

$$a = r + r\omega^2 + 2\omega\dot{r} + \ddot{r} + a_{rel}$$

where $2\omega\dot{r} = 0$ and
$\ddot{r} = 0$
because r (the length of the arm 71) is constant.
Also, $\dot{r} = 0$
because is 0 when the input shaft is rotated at a constant speed. The timing gears 93 likewise rotate the masses at the same constant speed as the input shaft. Thus, $$a = r\omega^2 + a_{rel}$$

where $r\omega^2$ is centrifugal force, while $a_{rel}$ is the movement of the shaft 73 at the end of the arms 71.

As a practical matter, $a_{rel}$ is small relative to the centrifugal force of the masses 31. This is because of the low mass of the arm 71 relative to the rotating masses 31 and also because the arms change direction of rotation with every half revolution or so of the masses 31.

The rotating masses 31 cause the arms to rotate first in one direction and then in the opposite direction. To see why this is so, reference is made to FIGS. 14 and 15. The centrifugal force is colinear to the extension 101 and points radially outward from the end of the arm. The mass 31 rotates clockwise from position 1 to position 2, then to position 3, then to position 4, and back to position 1. The mass rotates at a constant rpm. At position 1, the rotatable mass 31 is fully extended from and in line with the arm 71. The centrifugal force exerted by the mass is parallel to the arm and normal to the axis of rotation of the arm (which is the longitudinal axis of the shaft 73). Thus, there is no force or torque exerted on the end of the arm by the mass in this position.

As the mass rotates clockwise, it reaches position 2. In position 2, the centrifugal force of the mass is now normal to the end of the arm 71 (and is skewed relative to the longitudinal axis of the shaft 73). The centrifugal force exerts a torque on the arm, causing the arm to move clockwise, about its axis of rotation. This torque is shown in FIG. 15.

As the mass continues to rotate clockwise, it reaches position 3. In position 3, the centrifugal force of the mass is again normal to the axis of rotation. Thus, there is no torque exerted on the end of the arm by the mass.

As the mass continues to rotate clockwise, it moves from position 3 to position 4 and back to position 1. When the mass is at position 4, it exerts a torque in the opposition direction from that which it exerted in position 2. The arm 71 is moved counterclockwise, about its axis of rotation.

As FIG. 15 shows, the torque T exerted by the mass 31 in the arm 71 is sinusoidal. The torque is 0 when the mass is at positions 1 and 3. The torque is clockwise when the mass is moving between positions 1, 2, and 3, and is a maximum when the mass is at position 2. The torque is counterclockwise when the mass is moving between positions 3, 4, and 1, and is a maximum when the mass is at position 4. In between positions 2 and 4, the torque is either increasing (from position 1 to position 2 and from position 3 to position 4) or decreasing (from position 2 to position 3 and from position 4 to position 1). Also, the torque changes direction, even though the mass does not. As the mass rotates clockwise, the torque is first clockwise (from position 1 to position 3) and then counterclockwise (from position 3 to position 1). In the preferred embodiment, the eccentric masses 31 can rotate at 25–30 cycles or revolutions per second about their respective shafts 73.

Figures 16, 17:
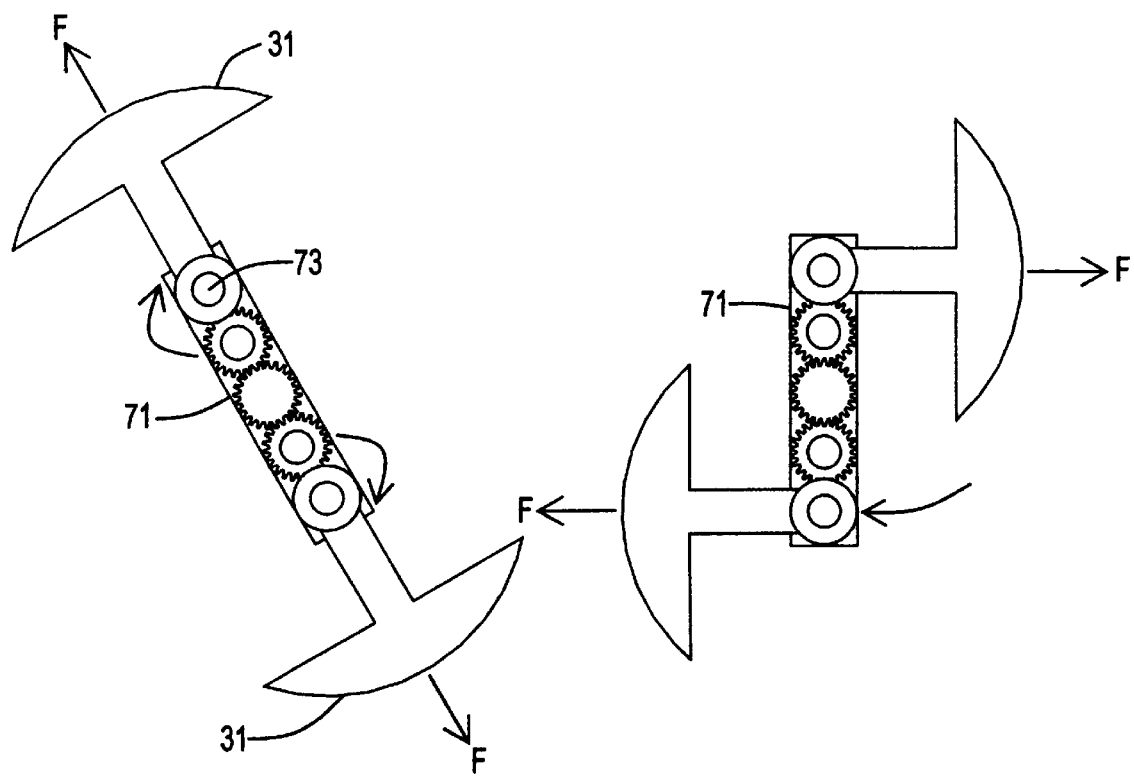
Figures 18, 19:
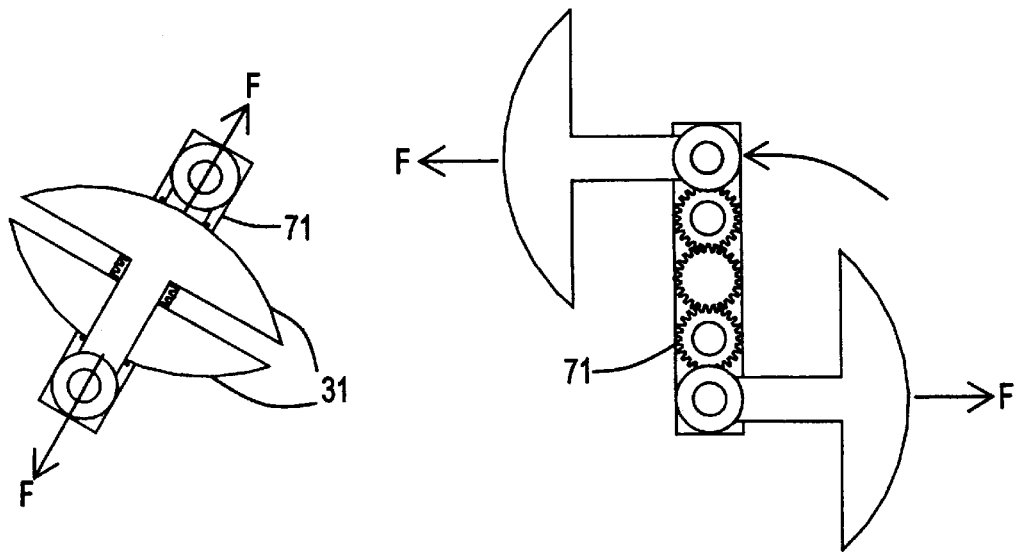

The masses on each end of the arms act together, as shown in FIGS. 16–19. (In FIGS. 16–19, the masses 31 rotate clockwise about their respective shafts 73.) Thus, when both arms are in their respective position 1, shown in FIG. 16, there is no torque T exerted on the arm 71. When both arms are perpendicular to the arm, in position 2 as shown in FIG. 17, clockwise torque is exerted on the arm, and the arm rotates clockwise. The arm continues to rotate clockwise as the masses rotate from position 2 to position 3 (FIG. 18), wherein 0 torque is exerted on the arm. As the masses rotate to position 4 (FIG. 19), the arm changes direction and rotates counterclockwise. The arm 71 continues to rotate counterclockwise as the masses rotate from position 4 to position 1, wherein the rotational cycle repeats. The arm actually precesses in the clockwise direction. (Both arms 71 rotate in unison.)

As the arms 71 oscillate back and forth, so does the attached mounting tube 77. Thus, the entire arm assembly 29 rotates. This bidirectional rotation of the arm assembly 29 is converted into unidirectional rotation by the one way gears 107, 109, which rotate the output shaft 19. Referring to FIG. 2 (and looking from the third leg 39 toward the first leg 35), as the arm assembly rotates clockwise, the first one way gear 107 is driven by the arm assembly and also rotates clockwise. The second one way gear 109 rotates counterclockwise. However, the second one way gear is driven, not by the mounting tube, but by the gears 115, 117, 119. Thus, the second one way gear 109 rotates in the opposite direction of the clockwise rotating arm assembly 29. The sprag clutch coupling the second one way gear to the mounting tube 77 allows the second one way gear to slip relative to the mounting tube.

When the arm assembly rotates counterclockwise, the second one way gear 109 is driven counterclockwise by the arm assembly. The first one way gear 107 rotates clockwise, being driven by the gears 115, 117, 119, 111. Thus, the first one way gear 107 rotates in the opposite direction of the counterclockwise rotating arm assembly. The sprag clutch associated with the first one way gear allows the first one way gear to slip relative to the mounting tube 77.

The output shaft 19 is driven by the first one way gear 107 when the arm assembly 29 is rotating clockwise and by the second one way gear 109 when the arm assembly is rotating counterclockwise.

The speed of the output shaft 19 can be varied, even when the input shaft 25 is rotating at a constant speed, or within a narrow range of speeds. The speed of the output shaft is varied by changing the center of gravity of the masses 31 in a respective set 95, 97.

This is illustrated in FIGS. 20–22, which shows the masses 95A, 95B of the first set. (In FIGS. 20–22, the hubs 99 are not shown.) The mass 95A is referred to as a phasing mass, because its phase can change with respect to the other mass 95B. The other mass 95B is referred to as a nonphasing mass, because it is used as a reference to the phasing mass 95A. In FIG. 20, the two masses 95A, 95B are shown aligned with each other. The two extensions 101 are adjacent to each other and the two masses are said to be in phase with each other. The center of gravity 102 of the two masses is located relatively far from the gears 103. With the arrangement shown in FIG. 20, the full speed of the input shaft 25 is transmitted to the output shaft 19.

The transmission 15 can be designed so that the output shaft 19 can be rotated faster than the input shaft 25. For example, the timing gears 93 (FIG. 8B) can be designed to rotate the masses 31 at a faster speed than the input shaft, thus creating an overdrive arrangement. Alternatively, the gears 51, 53 can be designed, or the output gears 111 et seq. can be sized to provide an overdrive arrangement.

In order to reduce the speed of the output shaft relative to the speed of the input shaft, the phasing mass 95A is oriented at an angle relative to the nonphasing mass 95B in the same set. For example, in FIG. 21, the masses 95A, 95B are shown as being 90 degrees out of phase with each other. This shifts the center of gravity 102 closer to the axis of rotation of the masses, which axis is the center of the gears 103. Consequently, the torque exerted by the masses on the end of the arm assembly lessens. As the torque that is applied to the load decreases, so does the speed of the loaded output shaft 19.

In FIG. 22, the two masses 95A, 95B are 180 degrees out of phase with each other. The center of gravity 102 has moved to the axis of rotation of the masses. Consequently, the masses exert no torque on the end of the arm assembly. The output shaft is not rotated at all.

Intermediate speeds can be reached by adjusting the phase of the masses to some phase between 0 and 180 degrees.

Figure 23:
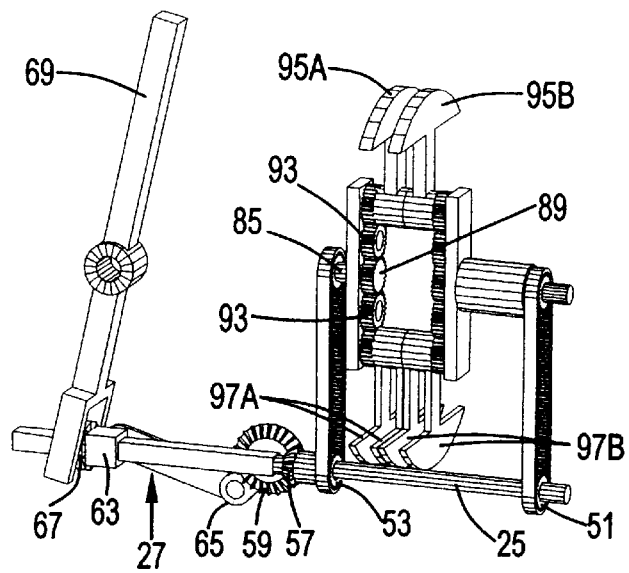
FIG. 23 is an isometric view of the transmission, shown without the frame, illustrating the rotatable masses in phase with each other.
Figure 24:
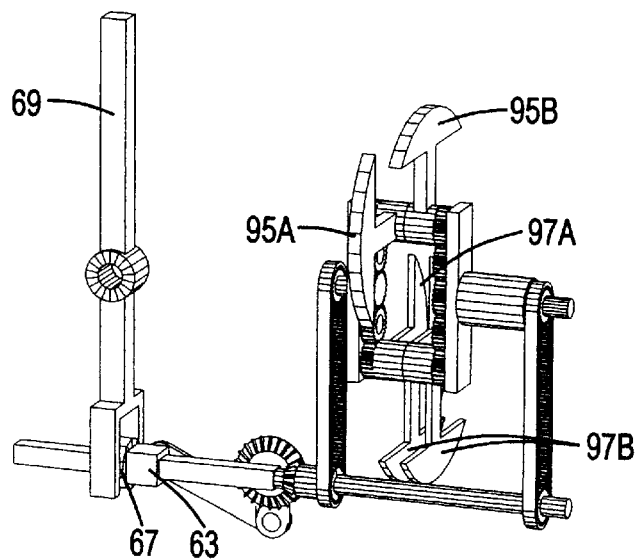
FIG. 24 is similar to FIG. 23, except the masses are shown 90 degrees out of phase.

The two sets of masses 95, 97 are of equal phase in order to maintain balance and reduce vibration. For example, reference is made to FIGS. 23–25. Referring to FIG. 23, the masses 95A, 95B of the first set are in phase with each other, as are the masses 97A, 97B of the second set. Maximum torque is generated for driving the output shaft. In FIG. 24, one of the masses 95A of the first set is 90 degrees out of phase with the other mass 95B. In order to balance out the arm assembly, two of the masses 97A of the second set are 90 degrees out of phase with the other masses 97B of the second set. For clockwise rotation, the masses 95A and 97A are rotated behind the other masses 95B, 97B. The torque produced by the arrangement of FIG. 24 is less than the torque produced by the arrangement of FIG. 23. When the output shaft is loaded, the output speed will be less than that shown with the arrangement of FIG. 23.

In FIG. 25, the mass 95A of the first set is 180 degrees out of phase with the other mass 95B, while the mass 97A of the second set is 180 degrees out of phase with the other mass 97B. The output shaft will not rotate at all because zero torque is being applied to the ends of the arm assembly.

The phase of the masses 31 is controlled by the speed control 27 (see FIG. 23). The speed control 27 varies the phase of the gear 53 relative to the gear 51. When the control stick 69 is moved (see FIGS. 23 and 24), the control member 67 and the slide block 63 are moved closer to the gear 53 along the input shaft. The linkage 65 rotates the bevel gears 59, 57, which in turn rotate the gear 53 about the input shaft. The gear 53 rotates the respective drive belt 105, which in turn rotates the second input arm shaft 85. The shaft 85 rotates the gear 89 and the timing gears 93, which in turn rotate the phasing masses 95A, 97A. Thus, the phase of the phasing masses 95A, 97A changes with respect to the input shaft 25 and also with respect to the nonphasing masses 95B, 97B. The nonphasing masses 95B, 97B remain unchanged with respect to the input shaft 25. This is because the gear 51 is fixed to the input shaft and also because the gear 51 drives the nonphasing masses 95B, 97B. As the input shaft is rotated, the gears 51, 53 are rotated at the same speed. Likewise, the masses are rotated at the same speed, but are now out of phase with each other.

A locking mechanism can be provided to contain the control stick in its position.

The transmission of the present invention can be modified in a variety of ways. For example, in FIG. 26, the transmission 131 is shown as having its input shaft 25 coaxial with the axis of rotation of the arm assembly 133. The arm assembly 133 rotates independently of the input shaft 25. The arm assembly 133 is made up of first and second parallel arms 135, 137 joined together at their ends by shafts 139. The first arm has perpendicularly extending projections 141, which receive the timing gears 93. The phasing masses 95A, 97A are located on the outside of the first arm 135, while the nonphasing masses 95B, 97B are located between the first and second arms 135, 137. The shafts 139 are spaced sufficiently far from the input shaft 25 to allow the masses 95A, 95B, 97A, 97B to rotate about the shafts. The masses 95A, 95B, 97A, 97B all have equal value, and the extensions 101 are all of equal length and mass. The phasing masses 95A, 97A are controlled by a phasing gear 143, which is coupled to a sleeve 145. The sleeve 145 is located around the input shaft 25. The phase of the phasing masses 95A, 97A is varied by a slider crank 147 rotating the sleeve 145 and gear 143 relative to the input shaft 25. The input shaft 25 rotates the sleeve 145, and the gears 143, 149. The nonphasing gear 149 rotates the nonphasing masses 95B, 97B. On the outside of the second arm 137 is a shaft 151 that supports the first and second one way gears 107, 109.

The operation of the transmission 131 is the same as for the transmission 15 described above. The input shaft 25 rotates the masses 95A, 95B, 97A, 97B by way of the gears 143, 93, 102 (for the phasing masses 95A, 97A) and gears 149, 93, 103 (for the nonphasing masses 95B, 97B). The rotating masses produce an oscillating torque that moves the arm assembly 133 back and forth. This rotates the shaft 151 back and forth which in turn is translated into rotation of the output shaft 19 in one direction by the one way gears 107, 109.

Figure 26:
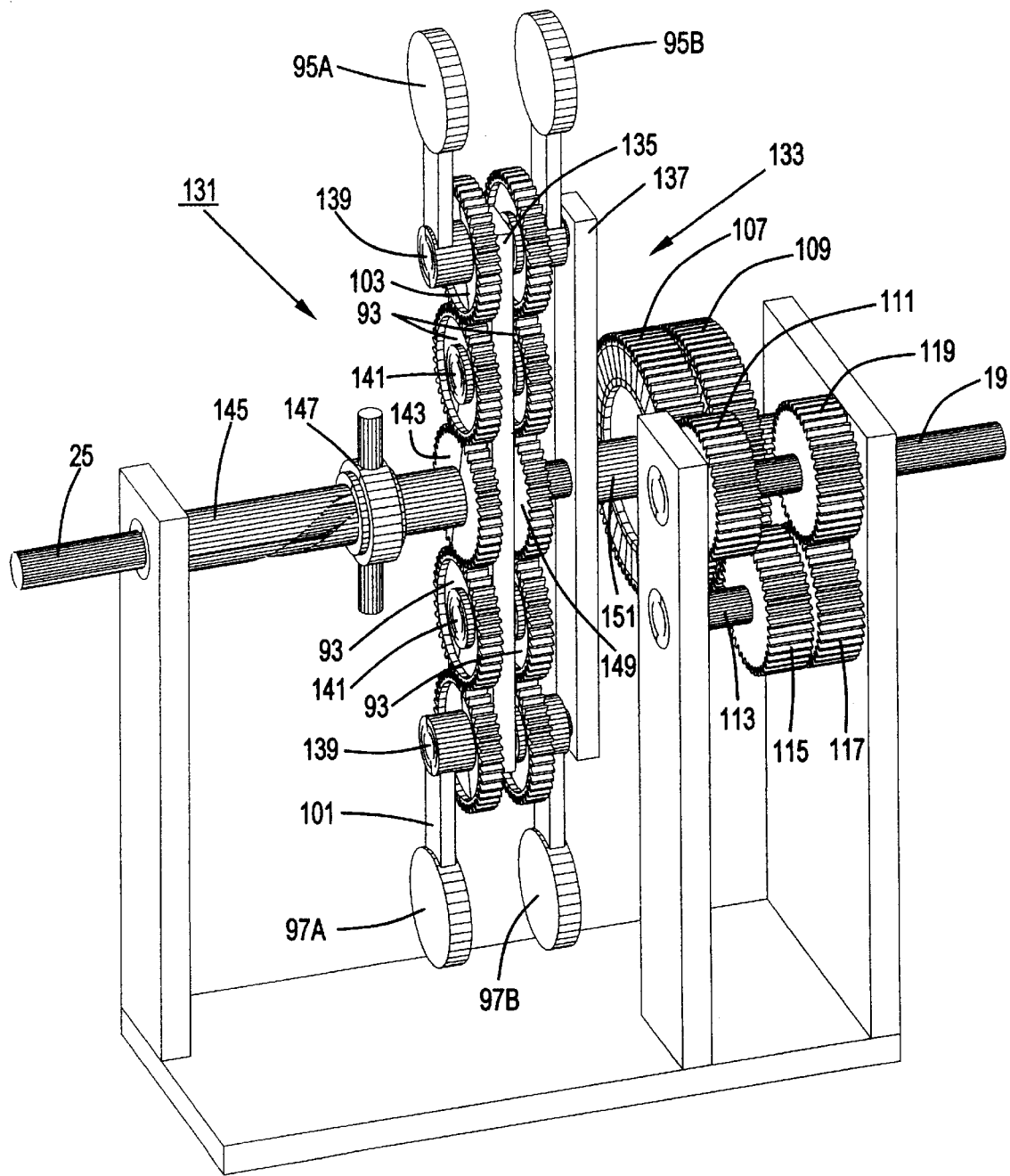
FIG. 26 is an isometric view of the transmission, in accordance with another embodiment.
Figure 27:
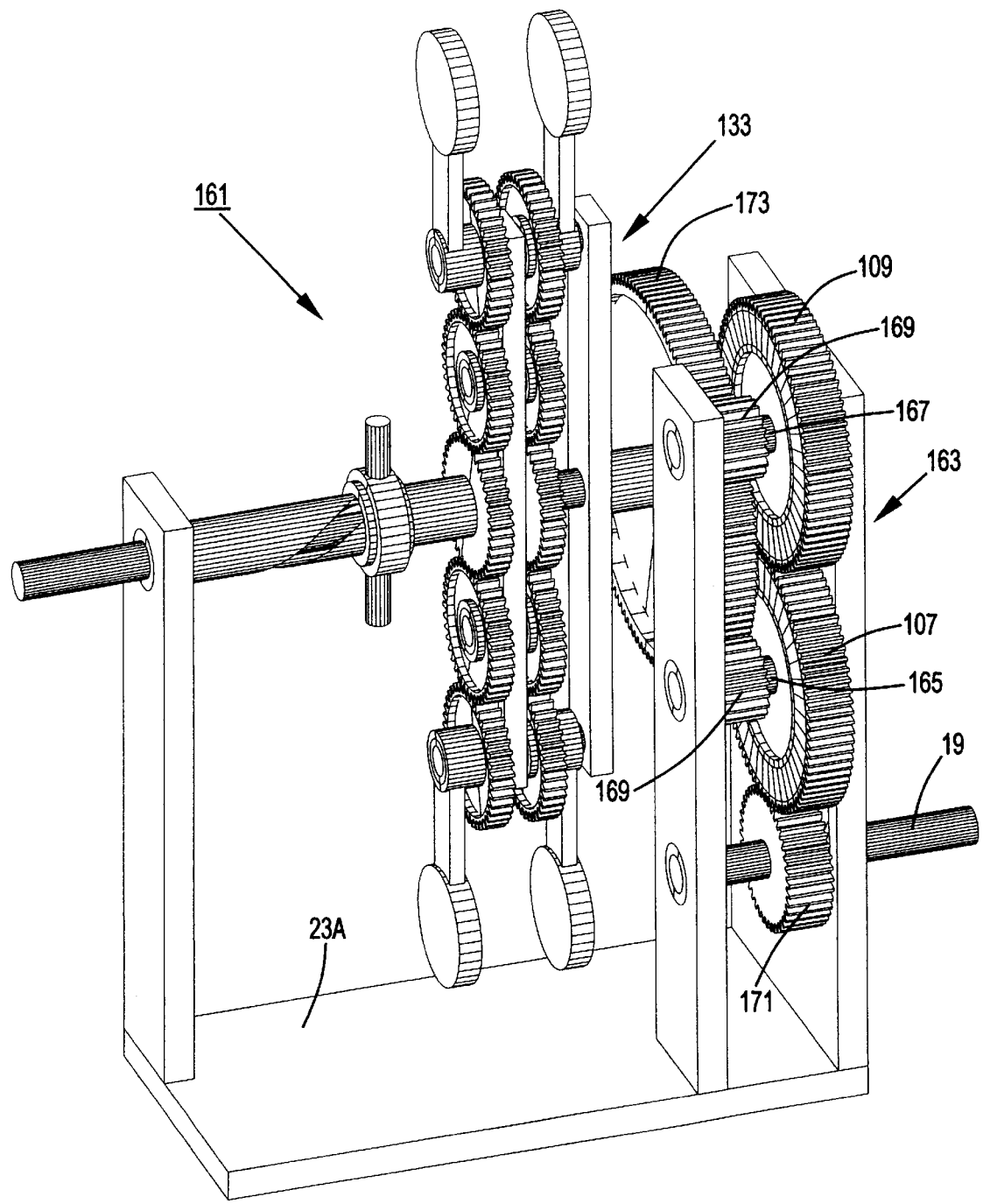
FIG. 27 is an isometric view of the transmission, in accordance with another embodiment.

The transmission 161 of FIG. 27 is similar to the transmission 131 of FIG. 26, except for the output assembly 163. In FIG. 26, the first and second one way gears 107, 109 are in series with each other. In FIG. 27, the first and second one way gears 107, 109 are in parallel with each other. Each one way gear is mounted to a respective auxiliary shaft 165, 167, which auxiliary shafts are parallel to each other. The auxiliary shafts 165, 167 are rotatably coupled to the frame 23A. The one way gears are coupled to each other and the first one way gear 107 is coupled to the output shaft 19 by a gear 171 on the output shaft. Each one way gear is coupled to the arm assembly gear 173 by a coupling gear 169.

As the arm assembly 133 oscillates back and forth due to the rotating masses, the arm assembly gear 173 is likewise rotated. When the arm assembly gear 173 rotates clockwise (looking from left to right in FIG. 27), the first one way gear 107 is driven counterclockwise by its auxiliary shaft 165 and therefore drives the output shaft 19 clockwise. The second one way gear 109 rotates clockwise and slips relative to its auxiliary shaft 167, which shaft rotates counterclockwise. When the arm assembly gear 173 rotates counterclockwise, the output shaft 19 is driven by the second one way gear 109 through the first one way gear 107. Specifically, the arm assembly gear 173 rotates the auxiliary shaft 167 clockwise, which drives the second one way gear 109. The second one way gear 109 drives the first one way gear 107 (which slips against the oppositely turning respective auxiliary shaft 165), which in turn drives the output shaft 19.

Figure 28:
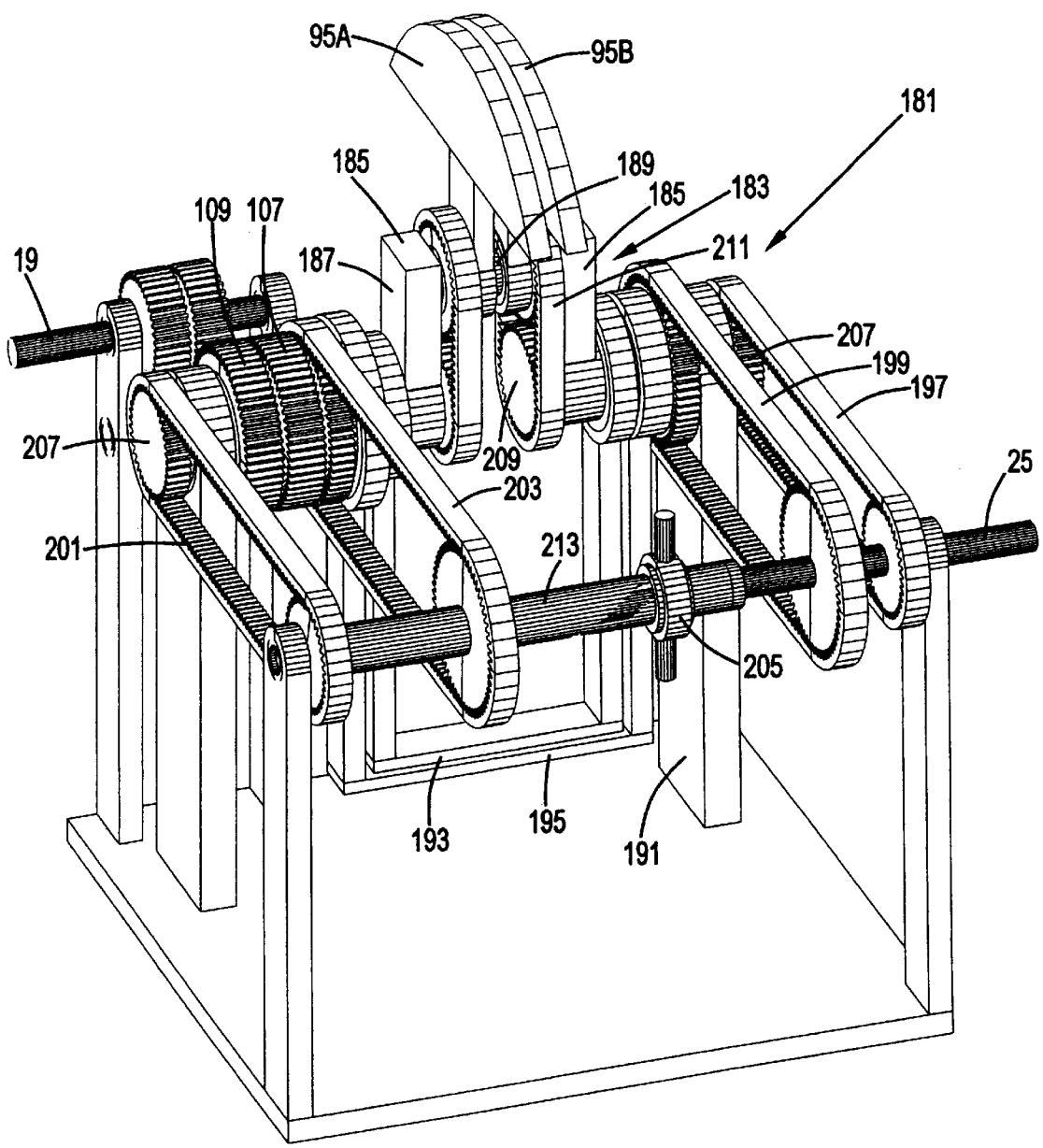
FIG. 28 is an isometric view of the transmission, in accordance with still another embodiment.

FIG. 28 shows another transmission 181. This transmission 181 has a half arm assembly 183 with the one way gears 107, 109 in series. The arms 185 in the arm assembly each have only one free end 187, instead of two free ends (as shown in FIG. 2). The rotatable masses are rotatably mounted to a shaft 189 that couples the ends 187 of the arms 185 together. The arms are rotatably coupled to a frame 191. The masses 95A, 95B rotate through the axis of rotation of the arm assembly 183.

In order to reduce vibration, counterweights 193, 195 are used to counterbalance each mass. Each counterweight is 180 degrees out of phase with its respective mass.

As the input shaft 25 rotates, the nonphasing mass 95B is rotated by a drive belt 197. The drive belt 197 rotates a gear 207, which is tied to another gear 209 by a shaft. The gear 209 rotates the mass 95B by a belt. Its respective counterweight 195 is also rotated by a belt 199. The phasing mass 95A is rotated by a belt 201, while its counterweight 193 is rotated by a belt 203. The belt 201 rotates a gear 207 which rotates another gear 209 by way of a shaft. The gear 209 rotates the mass 95A by a belt. Rotating the masses 95A, 95B causes the arm assembly 183 to oscillate, which oscillation is converted to unidirectional rotation by the one way gears 107, 109.

To vary the speed, a slider 205 is moved, which rotates a sleeve 213 and the belts 201, 203 relative to the input shaft 25. The phasing mass 95A is moved out of phase with the nonphasing mass 95B. The counterweight 193 is also moved so as to remain 180 degrees out of phase with the phasing mass 95A.

The transmission 181 has the advantage of a low arm mass, which is believed to increase the efficiency.

The counterweights 193, 195 serve to reduce vibration that might otherwise be caused by the rotating masses. The counterweights do not provide torque to the arms.

Although the speed control mechanism has been described as including a linkage (FIG. 2) or a sleeve and slider crank (FIG. 28), other mechanisms could be utilized. For example, the speed control could be servo-controlled (see FIG. 1). Also, the position of the slider can be controlled with a governor or other feedback device to provide automatic speed control.

Figure 29:
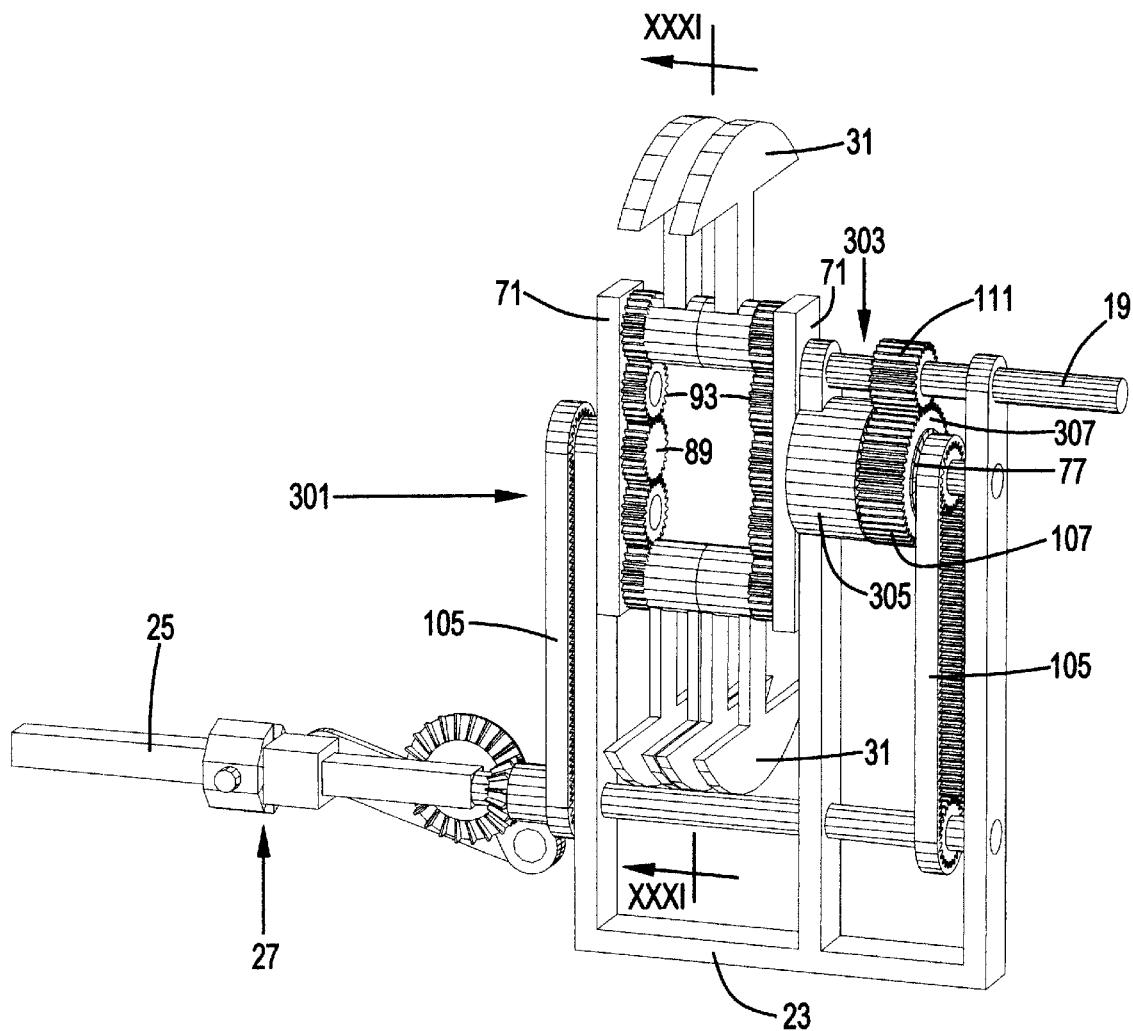
FIG. 29 is an isometric view of the transmission of the present invention, in accordance with another embodiment.

FIG. 29 shows the transmission 301 of the present invention in accordance with another embodiment. The transmission 301 is substantially similar to the transmission shown in FIG. 2 with the exception of the output assembly 303. Like numbers represent like components between the transmissions.

Figure 30:
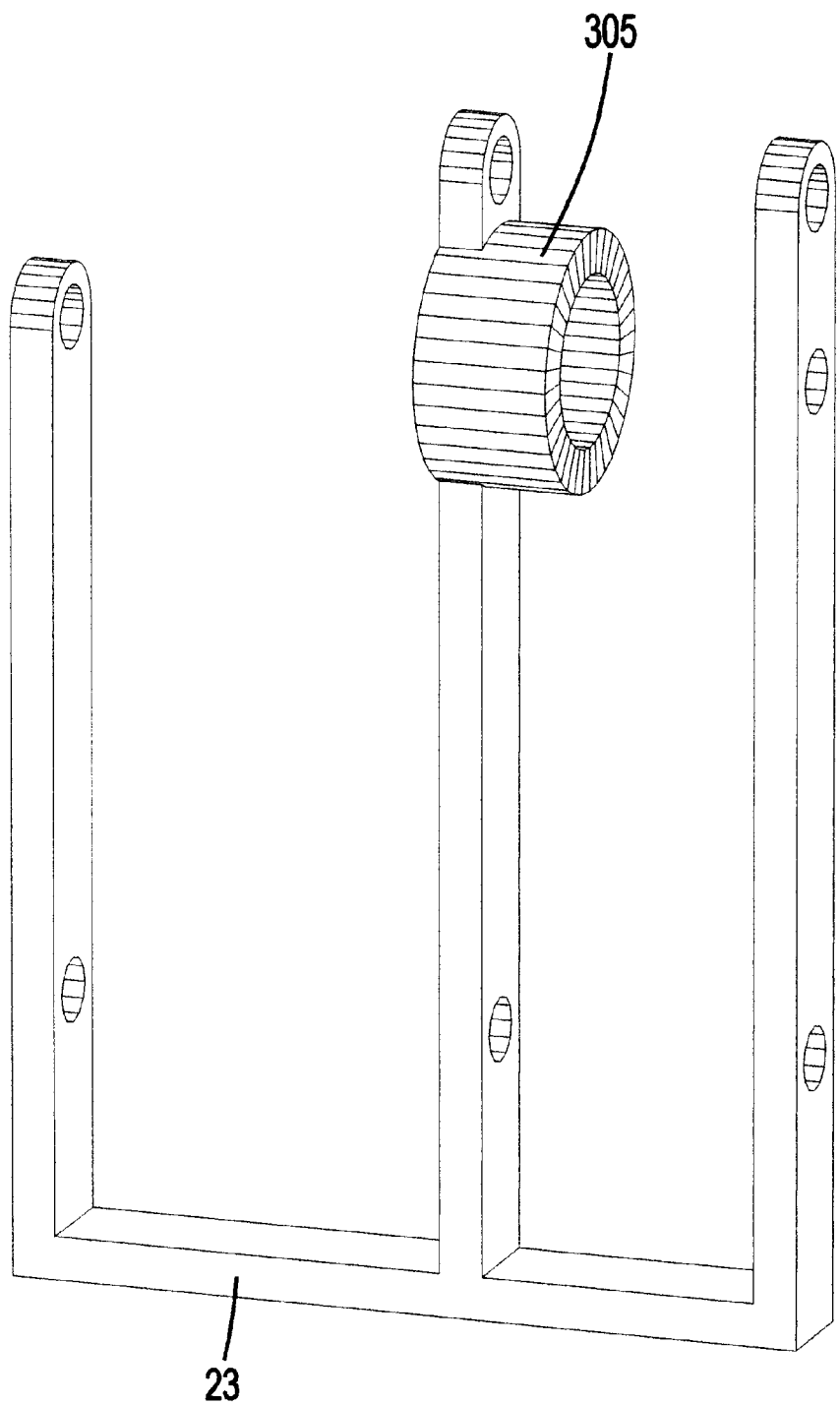
FIG. 30 is an isometric view of the frame of the transmission of FIG. 29.

The output assembly 303 utilizes two one way clutches 305, 307 (see FIGS. 29 and 30). In the preferred embodiment, the clutches 305, 307 are sprag clutches. The clutches are reversed relative to each other. Thus, the sprags in one of the clutches are oriented in the opposite direction from the sprags of the other clutch.

The inner race of each clutch 305, 307 is coupled to the mounting tube 77. Thus, rotation of the mounting tube rotates the inner race of each clutch.

The outer race of the clutches are coupled differently than in the transmission of FIG. 2. The outer race of the first clutch 305 is connected to the frame 23 so as to be fixed thereto. The outer race of the second clutch 307 is connected to the output gear 107. The output gear 107 is rotatably coupled to a gear 111 on the output shaft 19.

The operation of the transmission is the same as the transmission of FIG. 2, except for the output. Because of the one way clutch configuration, the arm (or arms) 71 rotates in only one direction. Referring to FIGS. 31–34, the arm 71 rotates clockwise (with reference to the orientation shown in FIGS. 31–34), but is unable to rotate counterclockwise.

Figure 31:
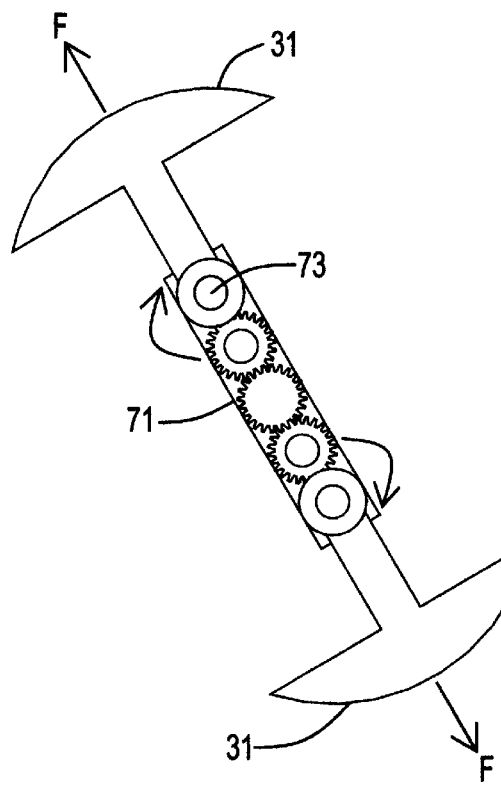
FIGS. 31–34 are cross-sectional views of the arm assembly taken through lines XXXI—XXXI of FIG. 29, and illustrating the rotation of the arm assembly as caused by the rotation of the eccentric and rotatable masses.
Figure 32:
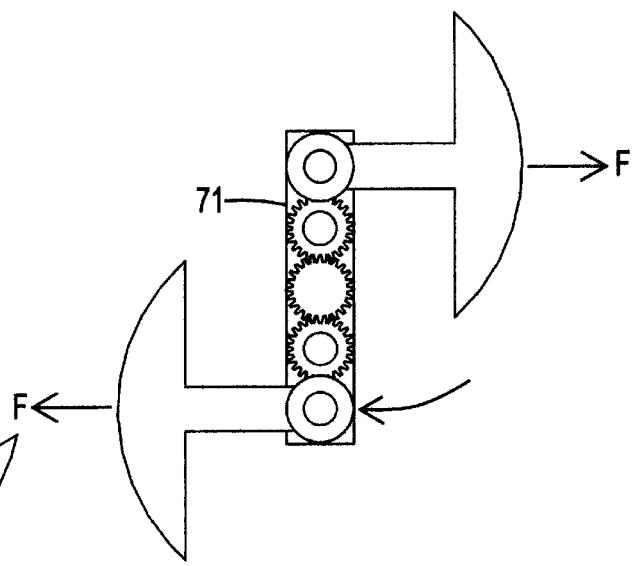

The masses 31 rotate clockwise about their respective shafts. When the masses 31 are extended out as shown in FIG. 31, there is no torque exerted on the arm 71. Consequently, no torque is exerted on the output shaft 19. When the masses are perpendicular to the arm 71, as shown in FIG. 32, clockwise torque is exerted on the arm 71, and the arms rotate clockwise. The arm 71 rotates the mounting tube 77. The first clutch 305 slips, while the second clutch 307 is driven, thus driving the output, or drive, shaft 19.

Figure 33:
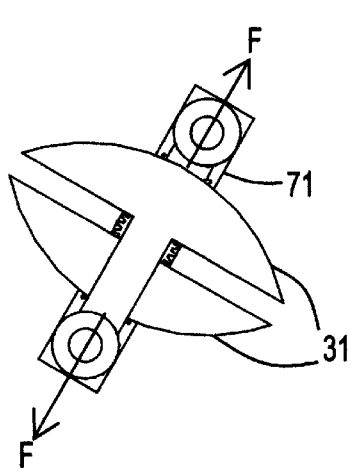
Figure 34:
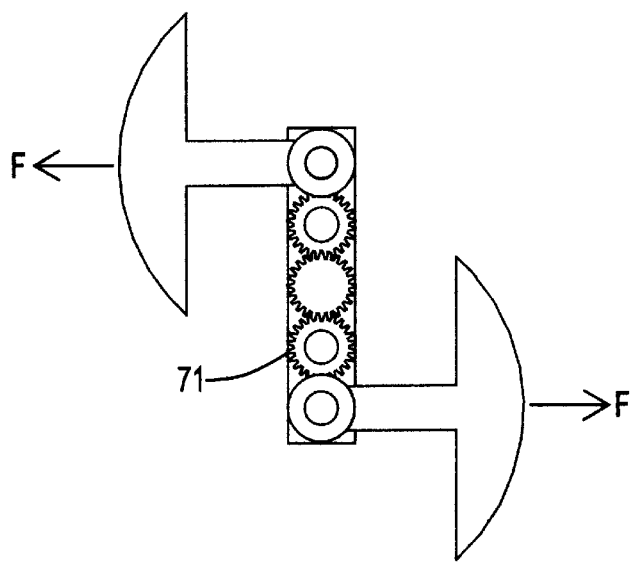

When the masses are extended in, as shown in FIG. 33, no torque is exerted on the arm 71. Consequently, no torque is exerted on the output shaft 19. The masses continue to rotate clockwise and extend perpendicularly to the arm 71, as shown in FIG. 34. The masses exert a counterclockwise torque on the arm 71. However, the arm 71 is prevented from moving clockwise by the first one way clutch, which is coupled to the frame. Likewise, the output shaft 19 is prevented from rotating. The second one way clutch 307 would slip if the mounting tube could rotate counterclockwise. The cycle repeats itself with the masses extending out as shown in FIG. 31.

By limiting movement of the arm 71 to only one direction, several advantages are realized. First, the power output of the transmission is increased. This is because the arm assembly 29 only transitions between on and off speeds. Referring to the examples of FIGS. 31–34, the arm assembly is either rotated clockwise or it is stopped. In the examples given in FIGS. 16–19, where the arm assembly is free to rotate in both directions, the arm assembly transitions between on, off and reverse. The arm assembly rotates clockwise, then is off (or stops), and then rotates counterclockwise.

Figure 35:
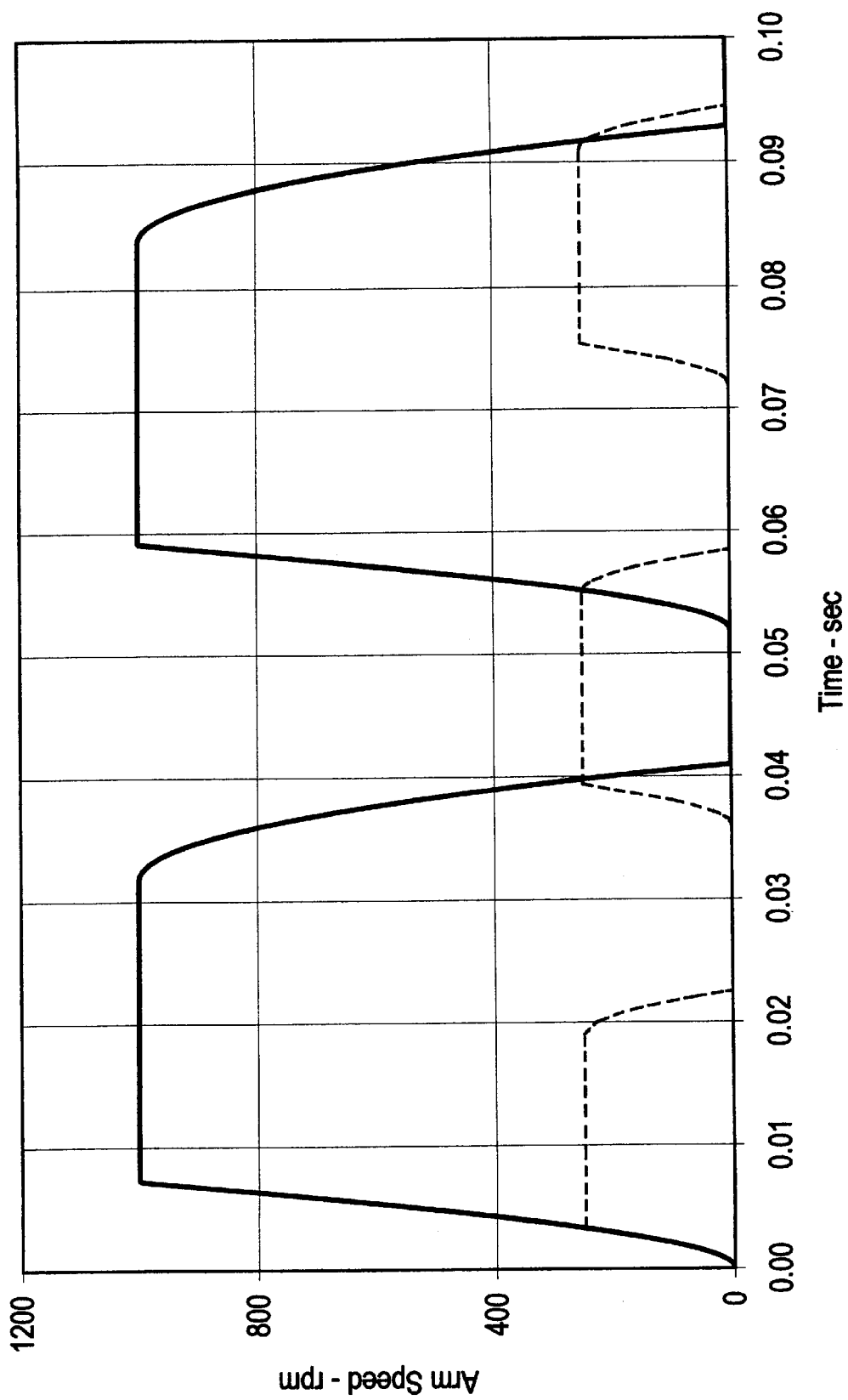
FIG. 35 is a graph comparing two different speeds of the arm assembly of the transmission of FIG. 29.

When the arm assembly is rotating at high speeds (for example 800–1800 rpm), it simply does not have the time to adequately reverse direction. As a result, the torque or power output of the transmission decreases. The arm assembly rotates in one direction in an on and off manner. FIGS. 31–33 show the arm 71 rotating in an on manner, while FIG. 34 shows the arm in an off, or stationary, manner. As the arm output speed increases, the on portion of the cycle becomes longer relative to the off portion. FIG. 35 shows this where the arm 71 output speed is shown in solid lines (1,000 rpm) and dashed lines (250 rpm). At the higher speed, the arm rotates for about 0.025 seconds, while at the slower speed, the arm only rotates at about 0.0175 seconds. The amount of torque provided to the output increases with the higher arm speed. The graph of FIG. 35 is exemplary and illustrates the transmission operating under the following conditions: input shaft speed is 1800 rpm, the unbalanced mass is 10 pounds with a radius of 6 inches, the arm mass moment of inertia is 0.414 inch-pounds seconds$^2$, the arm radius is 4 inches.

Another advantage of the transmission of FIG. 29 is that the output assembly is simplified, as it has fewer moving parts.

The output assembly 303 discussed above can be used with any of the transmissions herein.

Figure 36:
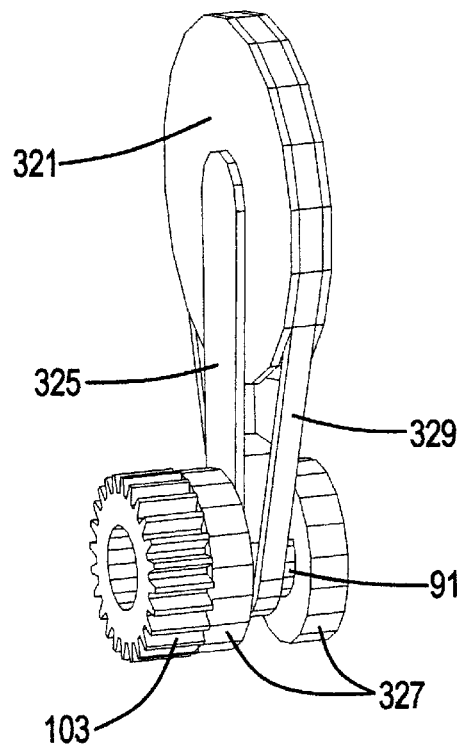
FIG. 36 is an isometric view of a rotatable mass, in accordance with another embodiment.
Figure 37:
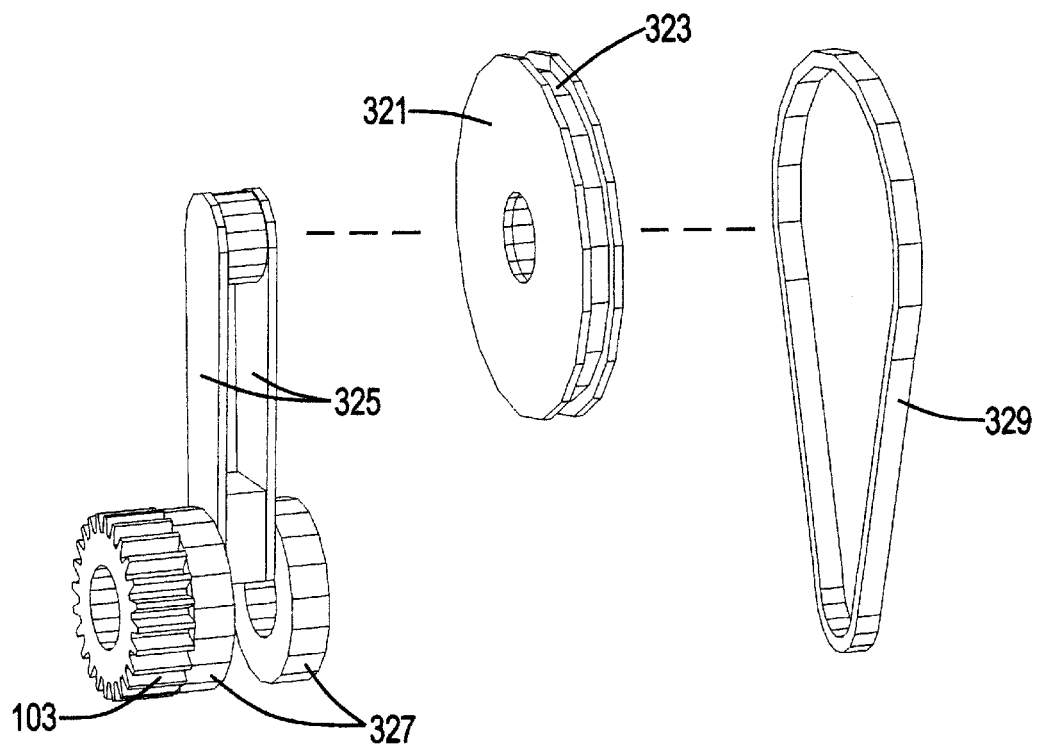
FIG. 37 is an exploded isometric view of the rotatable mass of FIG. 36.

FIGS. 36–37 illustrate a rotatable mass 321, in accordance with another embodiment, for use on any of the transmissions described herein. The mass 321 is disc shaped, with a groove 323 in the outer circumference. The mass 321 is rotatably coupled to the ends of the arms 325. The anus 325 in turn are coupled to a hub 327. The hub 327 is connected to the gear 103. The hub 327 and gear 103 are fitted onto a shaft 91 of the arm assembly 29 (see FIGS. 7B and 8B). (The shaft 91 is longer so as to extend into the hub 327.)

An endless belt 329 loops around the mass 321 in the groove 323 and around the shaft 91. As the gear 103 is rotated, the hub 327 and the arms 325 are likewise rotated. The center of the mass 321 is also rotated, but the mass rotates relative to the arms 325. This rotation of the mass relative to the arms is caused by the belt. The belt 329 bears much of the centrifugal force of the rotating mass. This enables the arms 325 and the belt 329 to have less mass than the arms 101 of the masses of FIG. 9A.

The moment of inertia of the arm assembly is reduced by the belt arrangement. This in turn leads to an increase in the amount of power that is output. In addition, the fatigue life of the arm assembly is increased.

The foregoing disclosure and the showings made in the drawings are merely illustrative of the principles of this invention and are not to be interpreted in a limiting sense.

What is claimed is:

1. A transmission, comprising:
   a) a rotatable input member;
   b) an arm that has a length and an end, the arm having an axis that is transverse to the length, the end being spaced from the axis, the arm end being rotatable about the axis, the arm be rotatable independently of the input member;

c) the arm having a mass that is rotatably coupled to the arm end, the mass being eccentric with respect to the arm end;

d) the input member being coupled to the mass so as to cause the mass to rotate with respect to the arm end;

e) first and second one way clutches coupled between the arm and an output member, the first one way clutch driving the output member in one direction when the arm is rotated in the one direction, the second one way clutch preventing the arm from rotating in the other direction.

2. The transmission of claim 1 further comprising a frame that is stationary with respect to the input member, the arm and the output member, wherein the second one way clutch is coupled to the frame.

3. The transmission of claim 1 wherein:

a) the coupling of the mass to the input member comprises gears;

b) the gears comprise a timing gear located on the arm.

4. The transmission of claim 1, wherein the mass is a first mass and the arm end is a first arm end, further comprising the arm having a second end and being rotatable about an intermediate portion between the first and second ends, an eccentric second mass being rotatably coupled to the arm second end, the second mass being coupled to the input member so as to be rotated by the input member.

5. The transmission of claim 1 wherein the mass is a first mass, further comprising:

a) a second mass rotatably coupled to the arm end, the second mass being eccentric with respect to the arm end and being rotatable by the input member;

b) the second mass having an adjustable phase with respect to the first mass;

c) a phase controller being coupled to the second mass so as to adjust the phase of the second mass with respect to the first mass.

6. The transmission of claim 5 wherein the arm has a first counterbalance for the first mass and a second counterbalance for the second mass.

7. The transmission of claim 5, wherein the arm end is a first arm end, further comprising:

a) the arm having a second end and being rotatable about an intermediate portion between the first and second ends;

b) a third mass and a fourth mass being rotatably coupled to the arm second end, the third and fourth masses being eccentric with respect to the arm second end and being rotatable by the input member;

c) the fourth mass having an adjustable phase with respect to the third mass;

d) the phase controller being coupled to the fourth mass so as to adjust the phase of the fourth mass relative to the third mass.

8. A method of transmitting mechanical power from a source to a load, comprising the steps of:

a) receiving a rotational input from the source;

b) using the rotational input to rotate an eccentric first mass about the end of an arm and to rotate a second eccentric mass about the end of the arm, thereby producing a torque on the arm;

c) allowing the arm to rotate in a first direction, but preventing the rotation of the arm in the opposite direction;

d) providing the torque acting on the arm in the first direction to the load;

e) adjusting the phase between the first and second masses so as to control the amount of torque applied to the arm.

* * * * *